(12) United States Patent
Murakami et al.

(10) Patent No.: US 12,520,023 B2
(45) Date of Patent: Jan. 6, 2026

(54) LENS APPARATUS AND IMAGE PICKUP APPARATUS

(71) Applicant: CANON KABUSHIKI KAISHA, Tokyo (JP)

(72) Inventors: Taro Murakami, Tokyo (JP); Yosuke Fukai, Kanagawa (JP); Kiyoshi Nitto, Saitama (JP); Yusuke Fujiwara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 18/474,802

(22) Filed: Sep. 26, 2023

(65) Prior Publication Data

US 2024/0114224 A1    Apr. 4, 2024

(30) Foreign Application Priority Data

Sep. 30, 2022 (JP) ................................ 2022-157470
May 17, 2023 (JP) ................................ 2023-081550

(51) Int. Cl.
*H04N 23/55* (2023.01)
*G03B 17/12* (2021.01)

(52) U.S. Cl.
CPC ............. *H04N 23/55* (2023.01); *G03B 17/12* (2013.01)

(58) Field of Classification Search
CPC ........ G03B 11/00; G03B 17/12; G03B 17/14; G03B 17/565; H04N 23/55
See application file for complete search history.

(56) References Cited

U.S. PATENT DOCUMENTS

| | | | |
|---|---|---|---|
| 2009/0323187 A1* | 12/2009 | Katsuda ............. | G02B 27/0006 359/508 |
| 2012/0098972 A1* | 4/2012 | Hansen .................. | H04N 23/45 348/E5.09 |
| 2012/0250153 A1* | 10/2012 | Kawasaki ............. | H04N 23/55 359/477 |
| 2017/0257541 A1* | 9/2017 | Saito ...................... | G03B 15/05 |
| 2020/0073081 A1* | 3/2020 | Matsumoto .......... | H02N 2/0085 |
| 2020/0092482 A1* | 3/2020 | Tsuruyama ............ | G06T 5/73 |
| 2020/0264404 A1* | 8/2020 | Hanaoka ................ | G02B 7/021 |
| 2021/0354979 A1* | 11/2021 | Ba-Tis .................. | H04N 23/687 |

FOREIGN PATENT DOCUMENTS

| | | |
|---|---|---|
| JP | 57-130808 U | 8/1982 |
| JP | 2005-070800 A | 3/2005 |
| JP | 2012-003022 A | 1/2012 |
| JP | 2020-067575 A | 4/2020 |

* cited by examiner

Primary Examiner — Amy R Hsu
(74) Attorney, Agent, or Firm — Cowan, Liebowitz & Latman, P.C.

(57) ABSTRACT

A lens apparatus includes a lens mount to which a camera body is attached, a mount cover provided at the lens mount, a filter, and a filter holding member that holds the filter. The filter holding member is attachable to the mount cover.

19 Claims, 30 Drawing Sheets

LENS APPARATUS AND IMAGE PICKUP APPARATUS

BACKGROUND

Technical Field

One of the aspects of this example relates to a lens apparatus and an image pickup apparatus.

Description of Related Art

Japanese Patent Laid-Open No. 2012-3022 discloses, as a camera system for stereoscopic image capturing, a camera system in which two optical systems are disposed in parallel and two image circles are imaged in parallel on one image sensor. Japanese Utility-Model Laid-Open No. 57-130808 and Japanese Patent Laid-Open No. 2020-67575 disclose a configuration in which a thin sheet film filter made of, for example, gelatin or triacetate is attached closest to the image plane side of an interchangeable lens. More specifically, Japanese Utility-Model Laid-Open No. 57-130808 discloses a configuration in which the filter is held by a U-shaped or semicircular member around an opening for a side on which the interchangeable lens is mounted. Japanese Patent Laid-Open No. 2020-67575 discloses a configuration in which a filter is directly held by a bayonet structure. Japanese Patent Laid-Open No. 2005-70800 discloses a configuration that includes a transparent plate disposed closer to the camera body than the rearmost lens unit and fixed to a fixed barrel, and an accessory attaching female screw provided at the rear end of a mount of a lens barrel, wherein the transparent plate is attached and screwed to a filter frame having the female screw.

With the configuration disclosed in Japanese Utility-Model Laid-Open No. 57-130808 or Japanese Patent Laid-Open No. 2020-67575, removal of the filter is troublesome, and thus the filter is prone to, for example, dirt adhesion, fingerprint adhesion, and flaw damage. Furthermore, the removed filter needs to be handled with care. The configuration disclosed in Japanese Patent Laid-Open No. 2005-70800 enables a general accessory filter to be directly screwed into the rearmost end of the lens barrel, and thus in a case where a thick filter is screwed in, a protrusion amount becomes large, and the intrusion into the camera body side becomes large. As a result, this intrusion may collide with a mechanical part such as a shutter inside the camera body. Furthermore, the configuration disclosed in Japanese Patent Laid-Open No. 2005-70800 may cause the user to touch the electrical contact of the interchangeable lens in attaching the filter. As a result, communication between the camera and the lens may fail due to contamination of the electrical contact with his fingerprint or the like.

SUMMARY

A lens apparatus according to one aspect of the embodiment includes a lens mount to which a camera body is attached, a mount cover provided at the lens mount, a filter, and a filter holding member that holds the filter. The filter holding member is attachable to the mount cover. An image pickup apparatus having the above lens apparatus also constitutes another aspect of the embodiment.

Further features of the disclosure will become apparent from the following description of embodiments with reference to the attached drawings.

DESCRIPTION OF THE EMBODIMENTS

Figure 1:
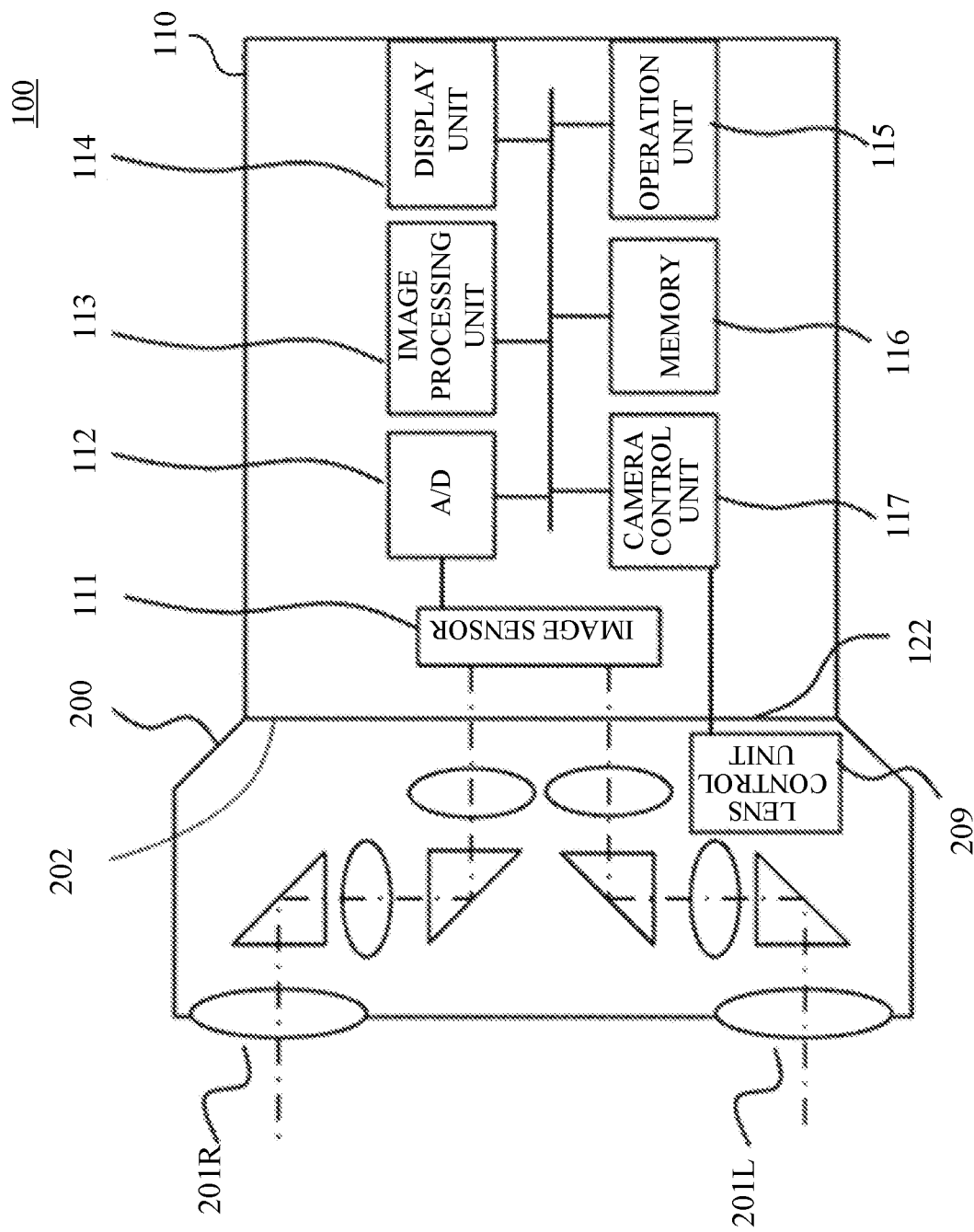
FIG. 1 is a schematic configuration diagram of an image pickup apparatus in each embodiment.

Exemplary embodiments of the present disclosure will be described below with reference to the accompanying drawings. In the drawings, any identical members are denoted by the same reference number, and duplicate description thereof is omitted.

First Embodiment

First, an image pickup apparatus 100 in a first embodiment will be described below with reference to FIG. 1. FIG. 1 is a schematic configuration diagram of the image pickup apparatus 100. In FIG. 1, the image pickup apparatus 100 includes a camera body 110 and a lens apparatus (interchangeable lens) 200 and can capture a stereoscopic video. The lens apparatus 200 is detachably attached to the camera body 110. In this embodiment, the image pickup apparatus 100 is an image capturing system including the camera body 110 and the lens apparatus 200 detachably attached to the camera body 110. However, this embodiment is not limited thereto but is also applicable to an image pickup apparatus in which a camera body and a lens apparatus are integrally configured.

The camera body 110 includes an image sensor 111, an A/D converter 112, an image processing unit 113, a display unit 114, an operation unit 115, a memory 116, a camera control unit 117, and a camera mount 122.

The lens apparatus 200 includes a right-eye optical system (first optical system) 201R, a left-eye optical system (second optical system) 201L, a lens mount (mount portion) 202, and a lens control unit 209 and is detachably mounted on the camera body 110. The two optical systems are arranged in parallel (bilaterally symmetrically) and configured such that two image circles are imaged in parallel on the image sensor 111. The two optical systems are separated from each other by a predetermined distance (baseline length) and arranged in a horizontal direction. When viewed from an imaging plane side (image side), an image formed through the right-eye optical system 201R located on the right side is recorded as a right-eye moving image or still image, and an image formed through the left-eye optical system 201L located on the left side is recorded as a left-eye moving image or still image. When played back, such moving images or still images are viewed by using a 3D display, VR goggles, or the like so that a right-eye video is displayed on the right eye of a viewer and a left-eye video is displayed on the left eye. In this case, the videos projected onto the right and left eyes has a parallax therebetween because of the baseline length, and thus the viewer can obtain a stereoscopic feeling. As described above, the lens apparatus 200 is a lens apparatus for stereoscopic image capturing that can form two images having a parallax therebetween through the two optical systems.

The camera control unit 117 and the lens control unit 209 are electrically connected to each other when the lens apparatus 200 is mounted on the camera body 110 through the lens mount 202 and the camera mount 122.

A right-eye image of an object formed through the right-eye optical system 201R and a left-eye image of the object formed through the left-eye optical system 201L are formed side by side on the image sensor 111. The image sensor 111 converts the formed images (optical signals) of the object into an analog electric signal. The A/D converter 112 converts the analog electric signal output from the image sensor 111 into a digital electric signal (image signal). Here, the A/D converter 112 may be built in the image sensor 111. The image processing unit 113 performs various kinds of image processing on the digital electric signal output from the A/D converter 112.

The display unit 114 displays various kinds of information. The display unit 114 is achieved by using, for example, an electronic viewfinder or a liquid crystal panel. The operation unit 115 has functions of a user interface through which a user provides an instruction to the image pickup apparatus 100. In a case where the display unit 114 includes a touch panel, the touch panel serves as one member of the operation unit 115. The memory 116 is achieved by using, for example, a ROM, a RAM, or a HDD. The memory 116 stores various kinds of data such as image data provided with image processing by the image processing unit 113, and also stores computer programs. The camera control unit 117 is achieved by using, for example, a CPU and collectively controls the entire image pickup apparatus 100.

Figure 2:
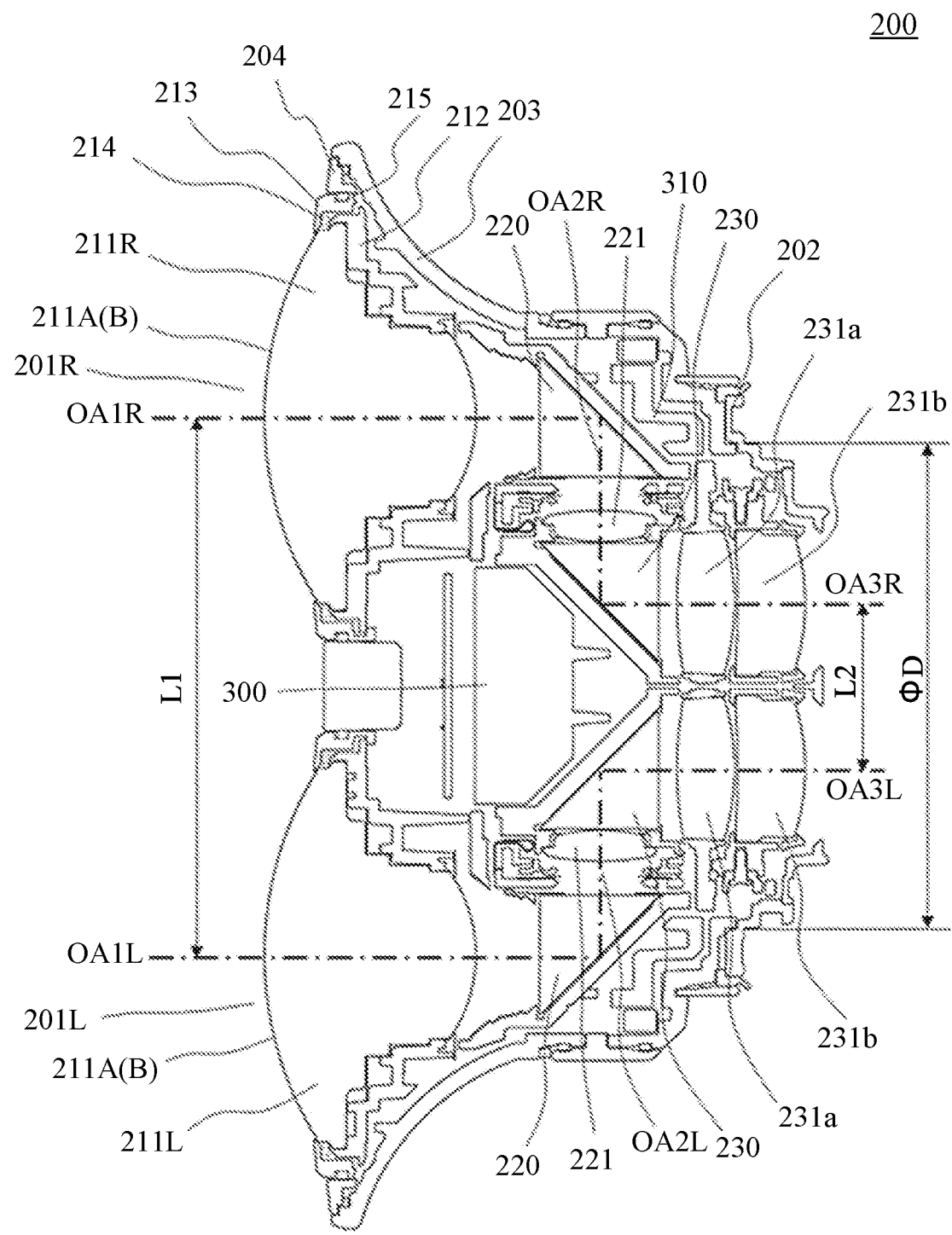
FIG. 2 is a sectional view of a lens apparatus in each embodiment.
Figure 3:
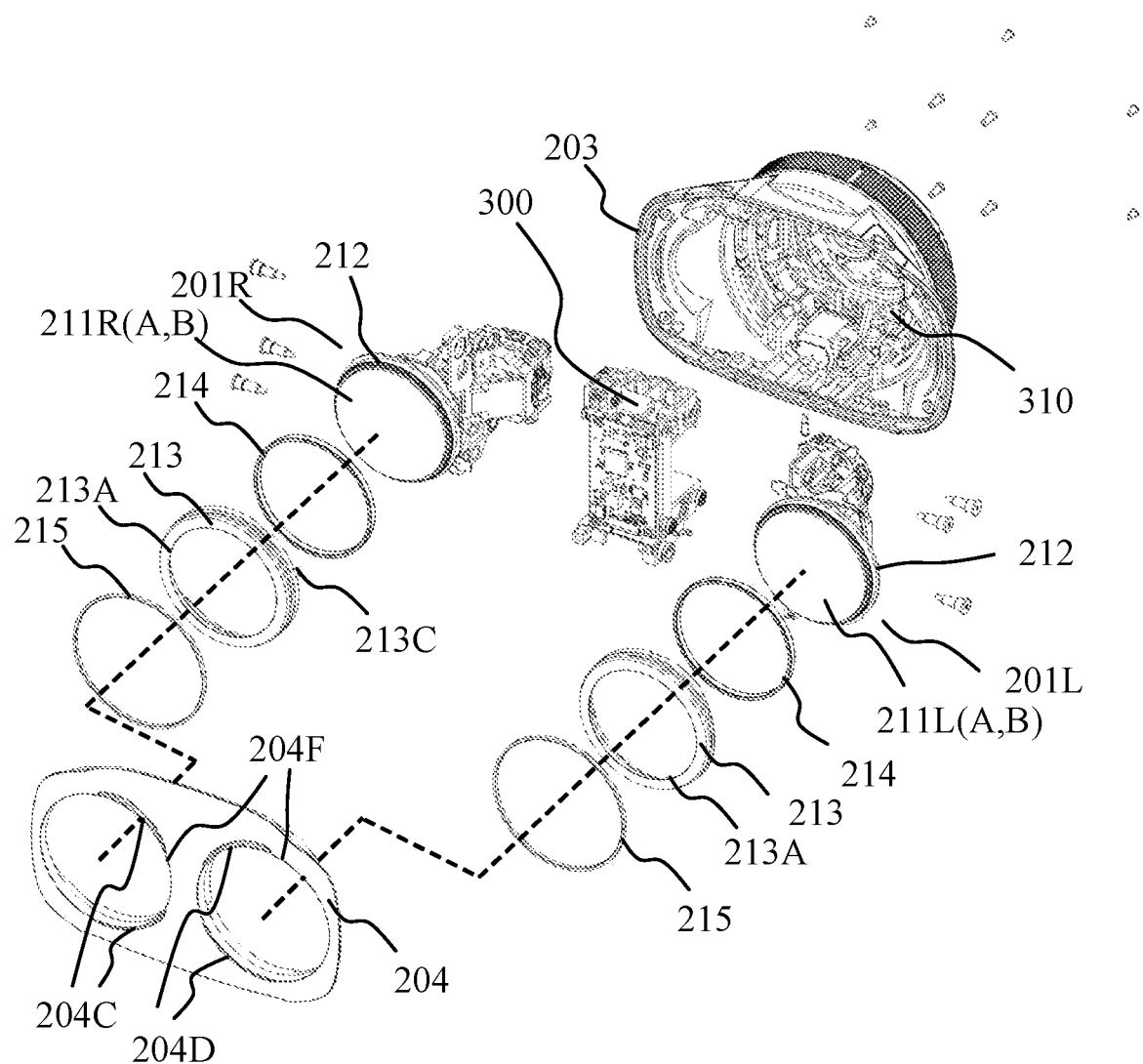
FIG. 3 is an exploded perspective view of the lens apparatus in each embodiment when viewed from an object side.
Figure 4:
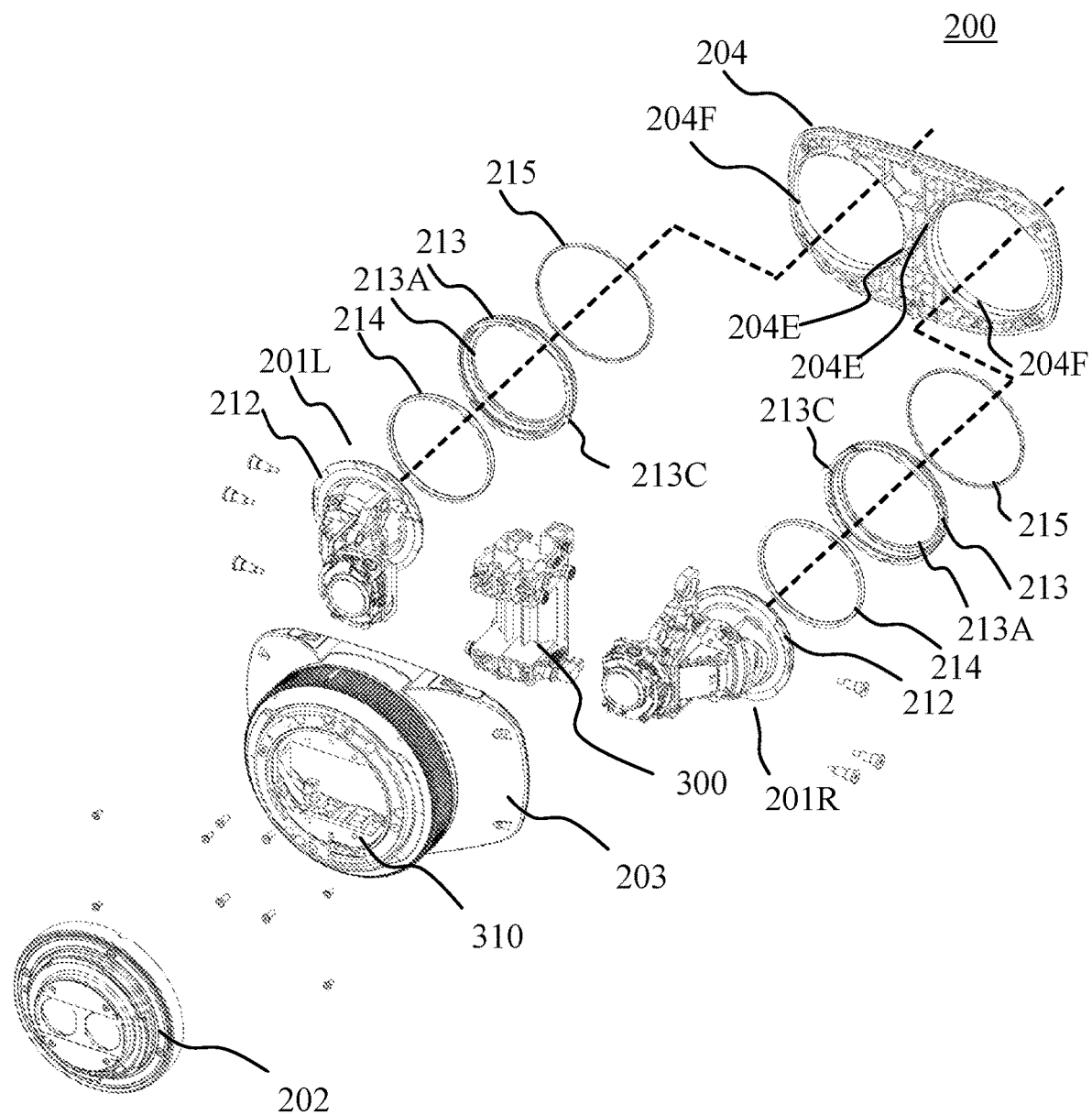
FIG. 4 is an exploded perspective view of the lens apparatus in each embodiment when viewed from an imaging plane side.

The lens apparatus 200 will be described below with reference to FIGS. 2 to 4. FIG. 2 is a sectional view of the lens apparatus 200. FIG. 3 is an exploded perspective view of the lens apparatus 200 when viewed from an object side (object side). FIG. 4 is an exploded perspective view of the lens apparatus 200 when viewed from the imaging plane side.

In the following description, R is appended to the end of the reference sign of an element related to the right-eye optical system 201R, and L is appended to the end of the reference sign of an element related to the left-eye optical system 201L. None of R and L is appended to the end of the reference sign of an element common to both the right-eye optical system 201R and the left-eye optical system 201L. Image pickup at the angle of view exceeding 180° can be performed through each of the right-eye optical system 201R and the left-eye optical system 201L. Each optical system is a bending optical system having two reflection surfaces. In each optical system, a first optical axis OA1, a second optical axis OA2 substantially orthogonal to the first optical axis OA1, a third optical axis OA3 parallel to the first optical axis OA1 are set in order from the object side. Each optical system includes a first group lens 211 having a convex lens surface 211A on the object side and disposed on the first optical axis OA1, a second group lens 221 disposed on the second optical axis OA2, and third group lenses 231*a* and 231*b* disposed on the third optical axis OA3. Each optical system includes a first prism 220 that bends a light beam along the first optical axis OA1 and guides the light beam to the second optical axis OA2, and a second prism 230 that bends a light beam along the second optical axis OA2 and guides the light beam to the third optical axis OA3. In the following description, an optical axis direction means a direction parallel to the first optical axis OA1 and extending to the object side and the imaging plane side.

Each optical system is fixed to a lens top base 300 by screw fastening or the like. The lens top base 300 is fixed to a lens bottom base 310 by screw fastening or the like. The lens bottom base 310 is movably held in the optical axis direction while its movement in a rotational direction is regulated by a non-illustrated straight movement structure. Accordingly, the right-eye optical system 201R and the left-eye optical system 201L can be integrally moved in the optical axis direction, and thus the focus positions of the optical systems can be simultaneously adjusted.

Figure 5:
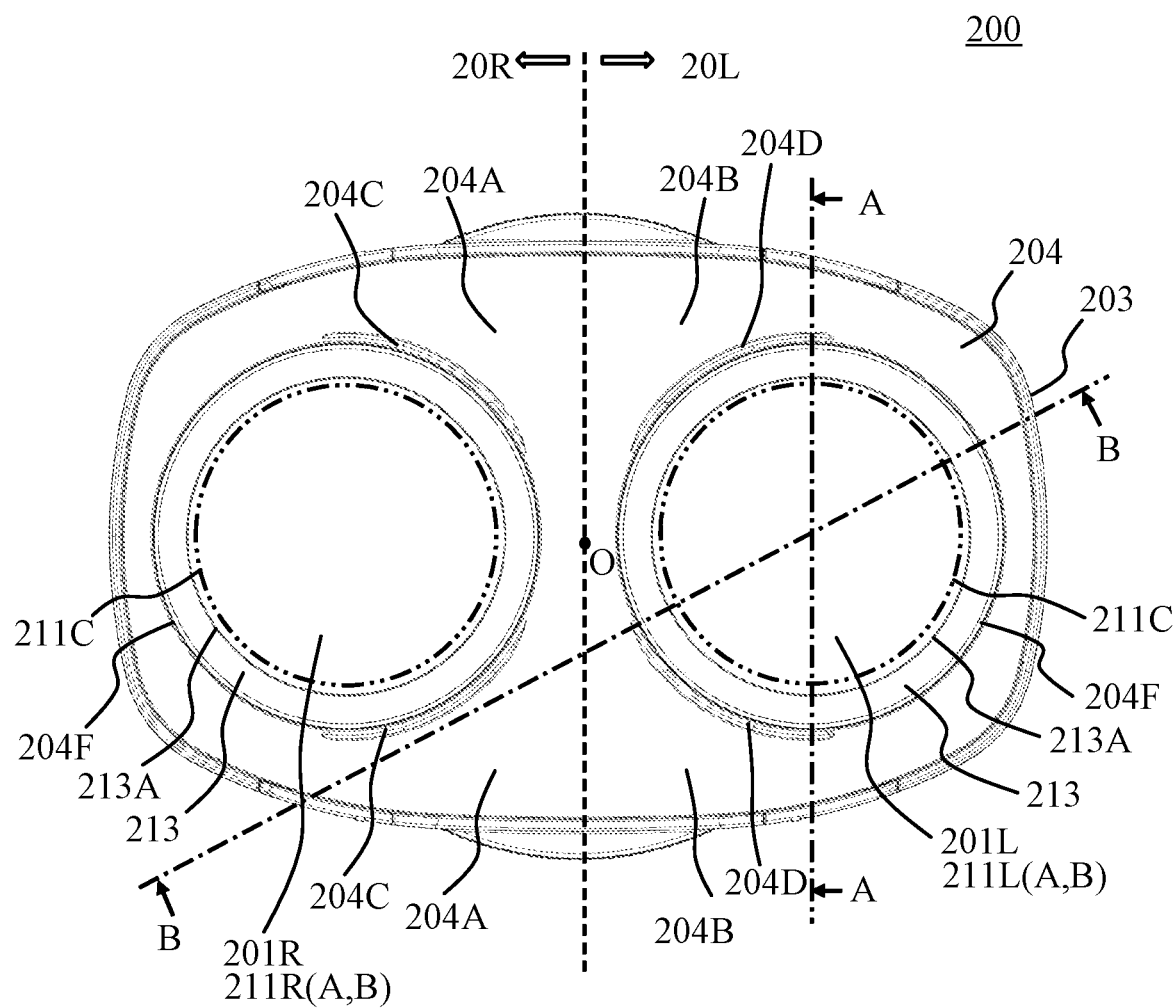
FIG. 5 is a front view of the lens apparatus in each embodiment.
Figure 6:
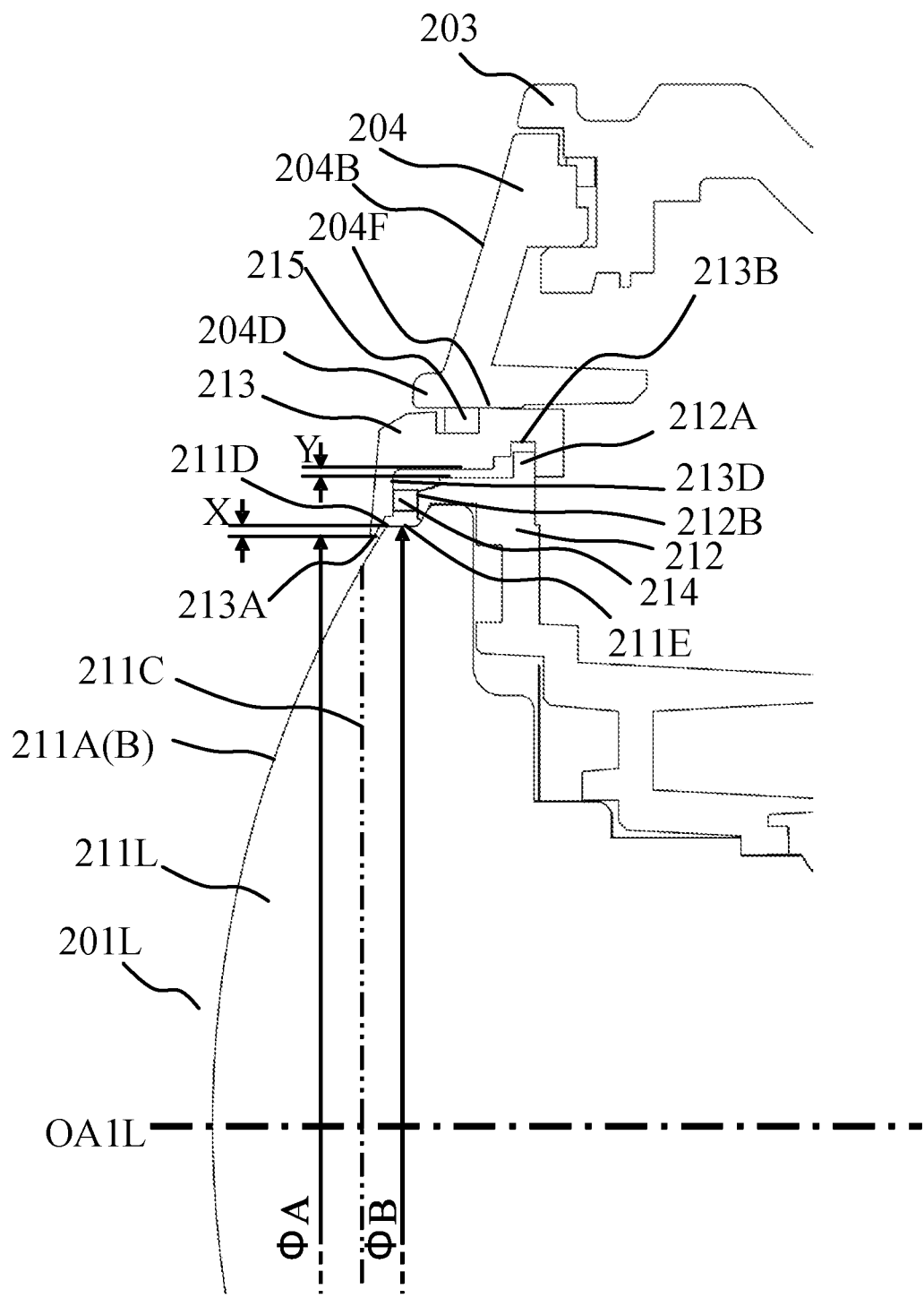
FIG. 6 is a sectional view along line A-A in FIG. 5.
Figure 7:
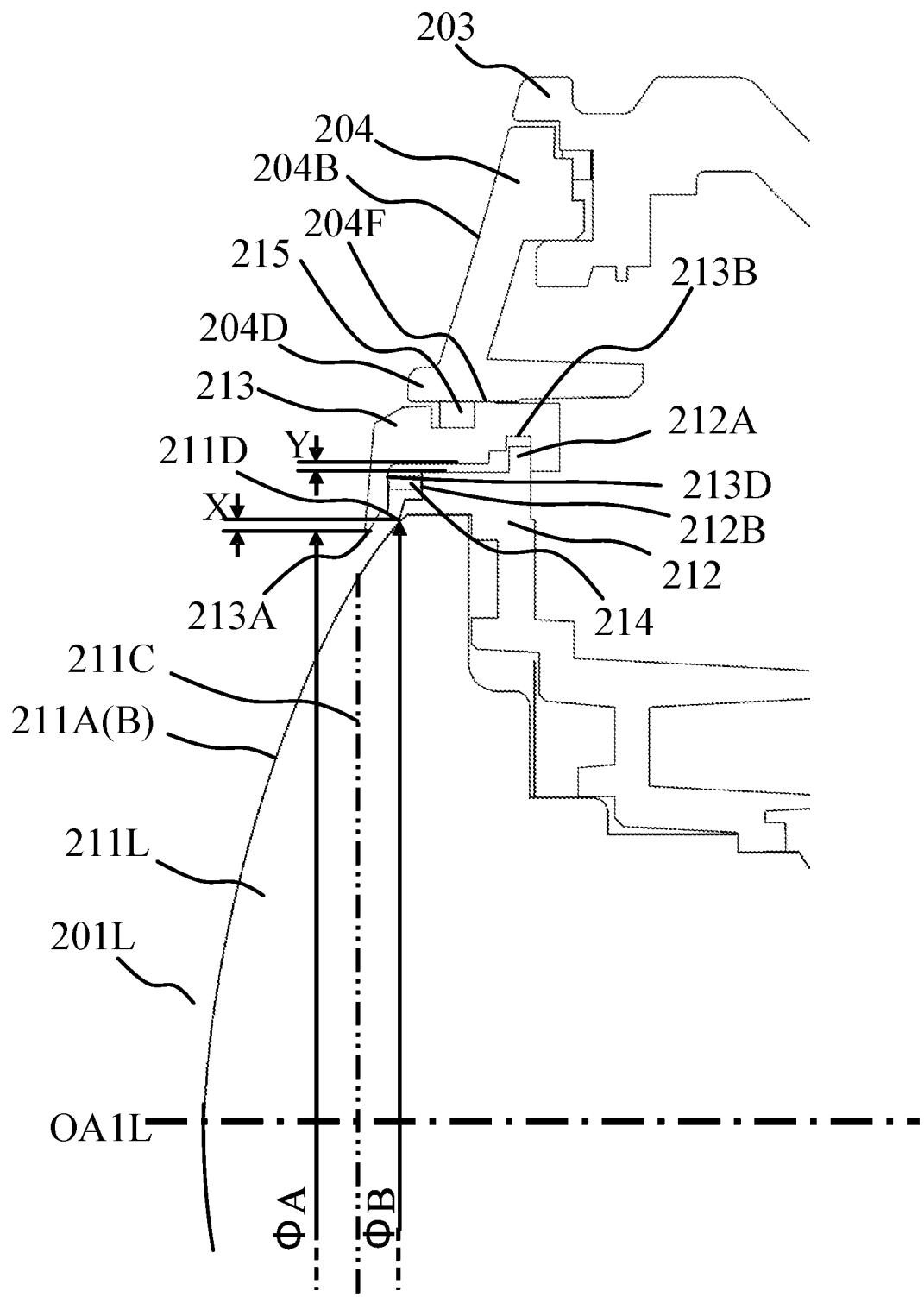
FIG. 7 is a sectional view along line A-A in FIG. 5 as a modification.
Figure 8:
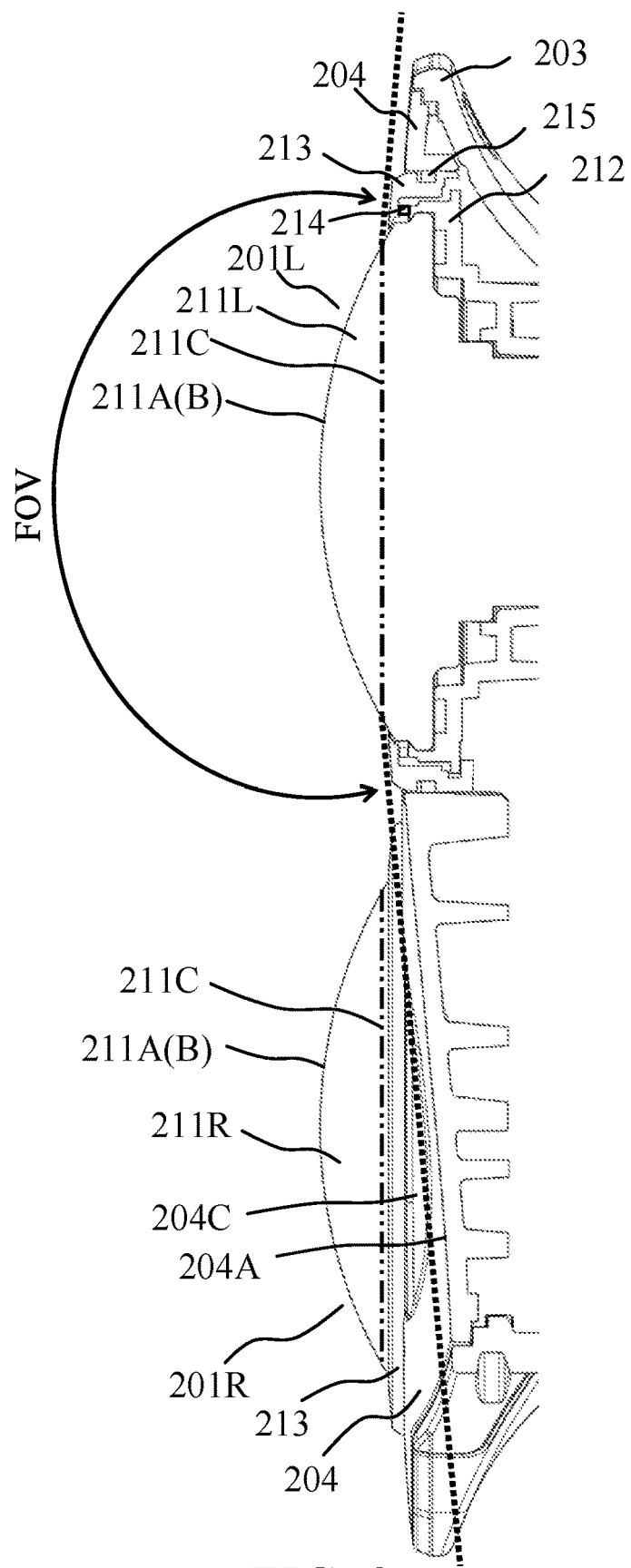
FIG. 8 is a sectional view along line B-B in FIG. 5.

The first group lens 211 and its peripheral structure will be described below with reference to FIGS. 5 to 8. FIG. 5 is a front view of the lens apparatus 200. FIGS. 6 and 7 are sectional views along line A-A in FIG. 5, illustrating the first group lens 211 of the lens apparatus 200 and its peripheral structure. FIG. 8 is a sectional view along line B-B in FIG. 5, illustrating the first group lens 211 of the lens apparatus 200 and its peripheral structure.

The lens apparatus 200 includes an exterior cover member 203 and a front surface exterior member (exterior member) 204. The exterior cover member 203 houses the right-eye optical system 201R and the left-eye optical system 201L. The front surface exterior member 204 is fixed to the exterior cover member 203 by screw fastening and can function as a lid with the exterior cover member 203 to house the front side of the lens apparatus 200.

The front surface exterior member 204 has openings (second openings) 204F into which the first group lens (first lens) 211R of the right-eye optical system 201R and the first group lens (second lens) 211L of the left-eye optical system 201L, respectively, are inserted. The front surface exterior member 204 has a shape that does not interrupt an effective light beam at an effective angle of view FOV, which exceeds 180°, of each of the right-eye optical system 201R and the left-eye optical system 201L. The lens surface 211A of each of the first group lenses 211R and 211L on the object side is an entrance surface for the effective light beam on the object side. When an effective entrance surface 211B is a part of the lens surface 211A on the inner side of an effective entrance surface outer diameter 211C, a light beam at an angle of view of 180° travels in a direction substantially orthogonal to the effective entrance surface 211B and the optical axis. A light beam at an angle of view exceeding 180° is positioned on the imaging plane side of the effective entrance surface 211B and travels further on the imaging plane side as it is positioned farther from the first group lens 211. Accordingly, the front surface exterior member 204 and the cover member 203 do not interrupt a light beam at an angle of view exceeding 180° and thus are disposed on the imaging plane side of the effective entrance surface 211B.

As illustrated in FIG. 5, sides closer to the right-eye optical system 201R and the left-eye optical system 201L with respect to a central point O between the right-eye optical system 201R and the left-eye optical system 201L are referred to as a right-eye region 20R and a left-eye region 20L, respectively. The front surface exterior member 204 has, in the right-eye region 20R, an object-side surface 204A positioned closer to the imaging plane side as it is further away from the first group lens 211L of the left-eye optical system 201L so that an outermost effective light beam (illustrated with a bold dotted line in FIG. 8) of the left-eye optical system 201L is not interrupted. The front surface exterior member 204 also has, in the left-eye region 20L, an object-side surface 204B positioned closer to the imaging plane side as it is further away from the first group lens 211R of the right-eye optical system 201R so that an outermost effective light beam of the right-eye optical system 201R is not interrupted. However, the first group lens 211L and its peripheral structure when viewed from the right-eye optical system 201R, and the first group lens 211R and its peripheral structure when viewed from the left-eye optical system 201L each also have a region in which part of the effective light beam of its counterpart is interrupted.

The front surface exterior member 204 includes wall portions 204C and 204D protruding on the object side of the object-side surfaces 204A and 204B to form the openings 204F. The wall portion 204C has an arc shape substantially coaxial with the first group lens 211R of the right-eye optical system 201R and does not interrupt the effective light beam of the right-eye optical system 201R but interrupts part of the effective light beam of the left-eye optical system 201L. The wall portion 204D has an arc shape substantially coaxial with the first group lens 211L of the left-eye optical system 201L and does not interrupt the effective light beam of the left-eye optical system 201L but interrupts part of the effective light beam of the right-eye optical system 201R.

As illustrated in FIG. 6, the lens apparatus 200 includes first group lens holding members 212 and cover members 213. The first group lens holding members 212 hold the first group lenses 211R and 211L. The cover members 213 cover outer peripheral parts of the lens surfaces 211A of the first group lenses 211R and 211L on the object side and have openings (first openings) 213A into which the first group lenses 211R and 211L are inserted. The openings 213A are formed such that the first group lenses 211R and 211L are exposed when viewed in the optical axis direction.

A boundary 211D with the corresponding lens surface 211A exists on the outer peripheral side of the effective entrance surface outer diameter 211C of the corresponding first group lens 211. The boundary 211D is the boundary between the lens surface 211A and the other surface or a member. For example, the boundary 211D may be the boundary between the lens surface 211A and a side surface 211E of the first group lens 211 or may be a boundary with an inner-circle leading end part having a swagger click shape and swaging the lens surface 211A and the first group lens 211R or 211L as illustrated in FIG. 7.

Each cover member 213 covers the corresponding boundary 211D. Specifically, the inner diameter of the opening 213A of each cover member 213 is smaller than the diameter of the corresponding boundary 211D. An overlap amount X on one side is expressed by Expression (1) below:

$$X = (\Phi B - \Phi A)/2 \quad (1)$$

where $\Phi A$ represents the inner diameter of the opening 213A and $\Phi B$ represents the diameter of the boundary 211D.

Since the boundary 211D is covered up, appearance quality is improved.

A groove portion 213B is formed at part of the inner periphery of the corresponding cover member 213. A convex portion 212A extending to the outer peripheral side is formed at part of the outer periphery of the corresponding first group lens holding member 212. The groove portion 213B and the convex portion 212A are assembled at positions not overlapping each other when viewed in the optical axis direction, and the convex portion 212A is inserted into the groove portion 213B as the cover member 213 is rotated. Accordingly, the cover members 213 is positioned with respect to the corresponding first group lens holding member 212 in the optical axis direction. The first group lens holding member 212 may be provided with a groove portion and the cover member 213 may be provided with a convex portion.

A predetermined gutter (first gap) Y extending in a direction (radial direction) orthogonal to the optical axis direction is formed between each first group lens holding member 212 and the corresponding cover member 213. The size of the predetermined gutter Y is smaller than the overlap amount X of the cover member 213, and thus the cover member 213 can cover the boundary 211D even when the first group lens holding member 212 or the cover member 213 is moved by the size of the predetermined gutter Y.

Each cover member 213 is positioned with respect to the corresponding first group lens holding member 212 in the optical axis direction and thus can be moved in the optical axis direction integrally with the first group lens holding member 212. The outer diameter of the cover member 213 is fitted to the inner diameter of the corresponding opening 204F of the front surface exterior member 204. A gutter (second gap) formed between the front surface exterior member 204 and the cover member 213 by the fitting and extending in the direction orthogonal to the optical axis direction is minute and smaller than the predetermined gutter Y.

Each cover member 213 includes a rotation regulation key (protrusion portion) 213C, and the front surface exterior member 204 includes a rotation regulation groove (groove portion) 204E corresponding to the rotation regulation key 213C. Accordingly, when the front surface exterior member 204 is assembled, the rotation regulation key 213C is inserted into the rotation regulation groove 204E and rotation of the cover member 213 is regulated. Thus, the cover member 213 can be prevented from being rotated and disengaged from the corresponding first group lens holding member 212. The cover member 213 may be provided with a rotation regulation groove, and the front surface exterior member 204 may be provided with a rotation regulation key. In other words, a rotation regulation key may be formed at one of the cover member 213 and the front surface exterior member 204, and a rotation groove may be formed at the other.

An optical-axis-direction sealing member 214 is a dripproof and dust-proof member disposed between a surface (first surface) 213D of the corresponding cover member 213 on the imaging plane side and a surface (second surface) 212B of the corresponding first group lens holding member 212, the surface 212B being positioned on the object side and facing the surface 213D. The optical-axis-direction sealing member 214 seals the gap between the surfaces 213D and 212B. The surfaces 213D and 212B are desirably provided on the entire circumference but may be partially provided. Since the optical-axis-direction sealing member 214 are sandwiched in the optical axis direction, the cover member 213 and the first group lens holding member 212 are pressed in the optical axis direction so that a gutter in the optical axis direction can be reduced.

To maintain the predetermined gutter Y, each optical-axis-direction sealing member 214 is disposed in a state in which a clearance (gap) larger than the corresponding predetermined gutter Y between the cover member 213 and the first group lens holding member 212 is formed in the direction orthogonal to the optical axis direction. The optical-axis-direction sealing member 214 is made of an elastically deformable material such as rubber or sponge and can absorb the predetermined gutter Y.

A radial-direction sealing member 215 is a drip-proof and dust-proof member disposed in a state being sandwiched between the corresponding cover member 213 and the corresponding opening 204F in the direction orthogonal to the optical axis direction. The radial-direction sealing member 215 on the right-eye optical system 201R side is disposed at a position where the radial-direction sealing member 215 interrupts the effective light beam of the left-eye optical system 201L, and the radial-direction sealing member 215 on the left-eye optical system 201L side is disposed at a position where the radial-direction sealing member 215 interrupts the effective light beam of the right-eye optical system 201R.

With the above-described configuration, it is possible to provide the lens apparatus 200 that can achieve dust-proof and drip-proof performance and optical performance while maintaining appearance quality and can perform stereoscopic image capturing at an angle of view exceeding 180°. Since each first group lens holding member 212 is not directly fitted to the corresponding opening 204F of the front surface exterior member 204, the position of the first group lens holding member 212 when positionally shifted due to influence of manufacturing error or the like is not corrected. Thus, optical performance and relative error between the right-eye optical system 201R and the left-eye optical system 201L do not change when the front surface exterior member 204 is incorporated.

Figure 9:
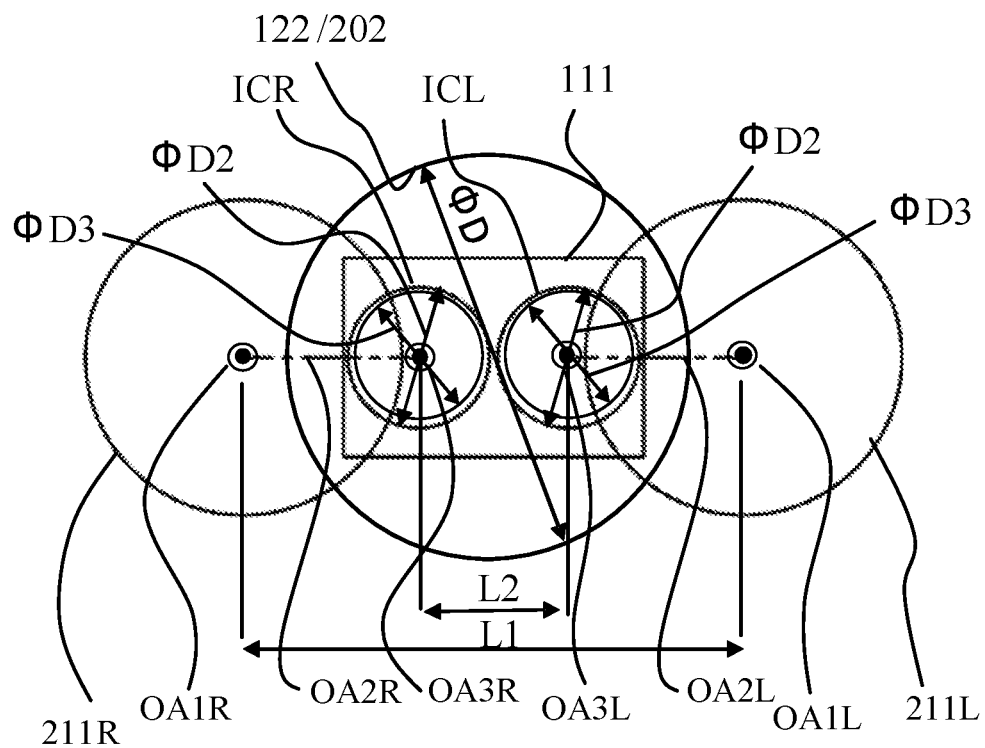
FIG. 9 is a disposition diagram of optical axes and image circles on an image sensor in each embodiment.

FIG. 9 is a diagram illustrating the positional relation among optical axes of the lens apparatus 200 and image circles on the image sensor 111. A right-eye image circle ICR formed with the effective angle of view through the right-eye optical system 201R and a left-eye image circle ICL formed with the effective angle of view through the left-eye optical system 201L are formed in parallel on the image sensor 111. A diameter $\Phi D2$ of the image circles and the separate distance between the image circles may be set so that the image circles do not overlap each other as much as possible. For example, in a case where the light receiving range of the image sensor 111 is divided in half into right and left regions with respect to its center, the center of the right-eye image circle ICR may be set substantially at the center of the right region, and the center of the left-eye image circle ICL may be set substantially at the center of the left region.

Each optical system is a wide-angle fish-eye lens. In this embodiment, each optical system is a circular fish-eye lens, and an image formed at an imaging plane is a circular image of a range with the angle of view exceeding 180°. Two circular images are formed on the right and left sides, respectively, as illustrated in FIG. 9. A stereoscopic feeling at viewing increases as a distance (baseline length) L1 between the first optical axis OA1R of the right-eye optical system 201R and the first optical axis OA1L of the left-eye optical system 201L increases. For example, the image sensor 111 has a size of 24 mm×36 mm, the diameter $\Phi D2$ of each image circle is 17 mm, a distance L2 between the third optical axes OA3R and OA3L is 18 mm, and the length of each second optical axis is 21 mm. In a case where each optical system is disposed such that its second optical axis is aligned with the horizontal direction, the baseline length L1 is 60 mm, which is substantially equal to the eye width of an adult. In a case where a diameter OD of the lens mount 202 is shorter than the baseline length L1 and the distance L2 between the third optical axes is shorter than the diameter OD of the lens mount 202, lenses on the third optical axes can be disposed inside the lens mount 202. In VR viewing, an angle of view with which a stereoscopic feeling can be obtained is 120° approximately, but the visual field of 120° still provides discomfort and thus the angle of view is often increased to 180°. Since the effective angle of view exceeds 180° in this embodiment, the diameter $\Phi D2$ of each image circle of this embodiment is larger than a diameter $\Phi D3$ of the image circle at an angle of view in the range of 180°.

Figure 10:
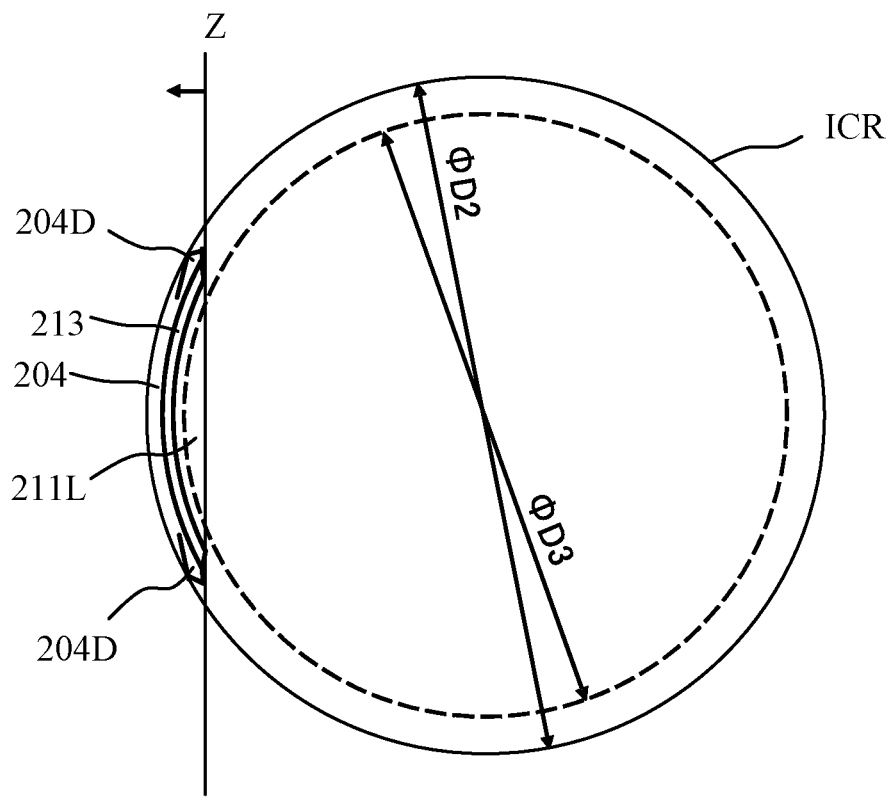
FIG. 10 is a diagram illustrating an included portion of a left-eye optical system in an image captured by a right-eye optical system in each embodiment.

FIG. 10 is a diagram illustrating an included portion of the left-eye optical system 201L in an image captured by the right-eye optical system 201R. An image of the wall portion 204D of the front surface exterior member 204 is captured inside the diameter $\Phi D2$ of an image circle with the effective angle of view, is not captured with the angle of view of 180°, and is captured outside the diameter $\Phi D3$ of an image circle with an angle of view in the range of 180°. Thus, in VR viewing, the image does not affect viewing with the angle of view of 180°. For example, the first group lens 211L and the cover member 213 of the left-eye optical system 201L and the wall portion 204D of the front surface exterior member 204 in the left-eye region 20L exist in the effective angle of view of the right-eye optical system 201R and appear in the actual effective image capturing range as illustrated in FIG. 10. Only the first group lens 211L is positioned inside the image circle with the angle of view of 180° (on the inner side of the diameter ΦD3), but the cover member 213 and the wall portion 204D are positioned outside the image circle with the angle of view of 180°. The captured image of the wall portion 204D is positioned outside an apex portion of the first group lens 211L (on the left side in FIG. 10) when viewed in the horizontal direction as well. The captured image of the wall portion 204D has no influence when the outside of the apex portion of the first group lens 211L, which is inevitably included due to specifications as illustrated with a straight line Z, is cut by image processing or image editing. This is the same for an included portion of the right-eye optical system 201R in an image captured by the left-eye optical system 201L. As described above, the wall portion 204D is positioned in the effective angle of view but disposed to have substantially no influence on image capturing in actual VR usage.

Figure 11A:
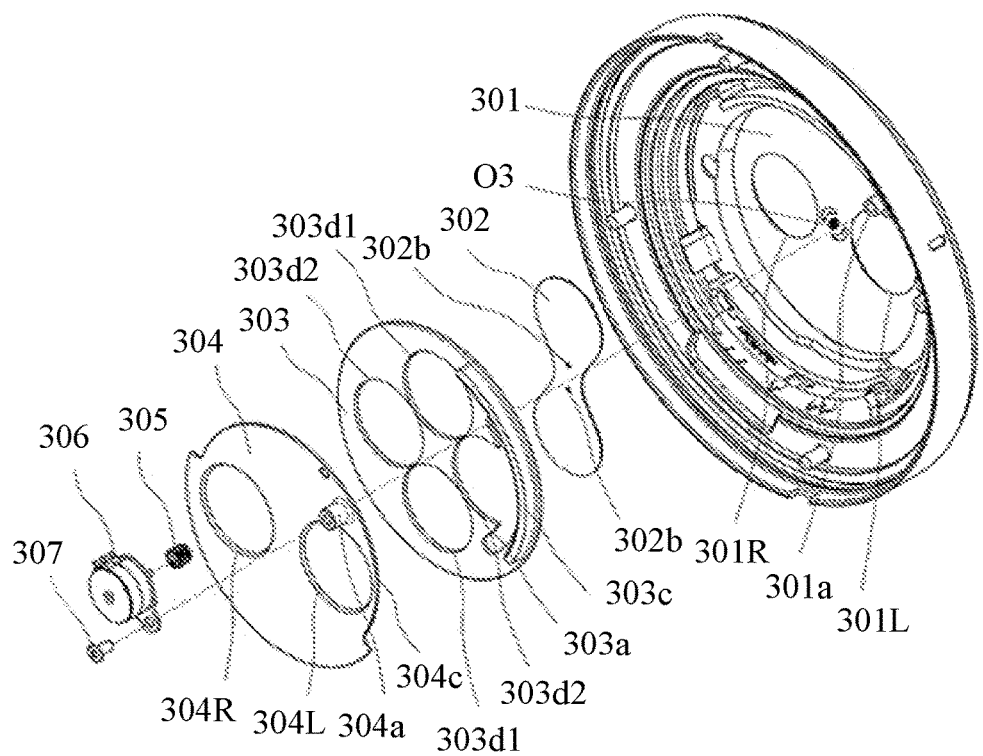
FIGS. 11A and 11B are exploded perspective views of a filter configuration in a first embodiment.
Figure 11B:
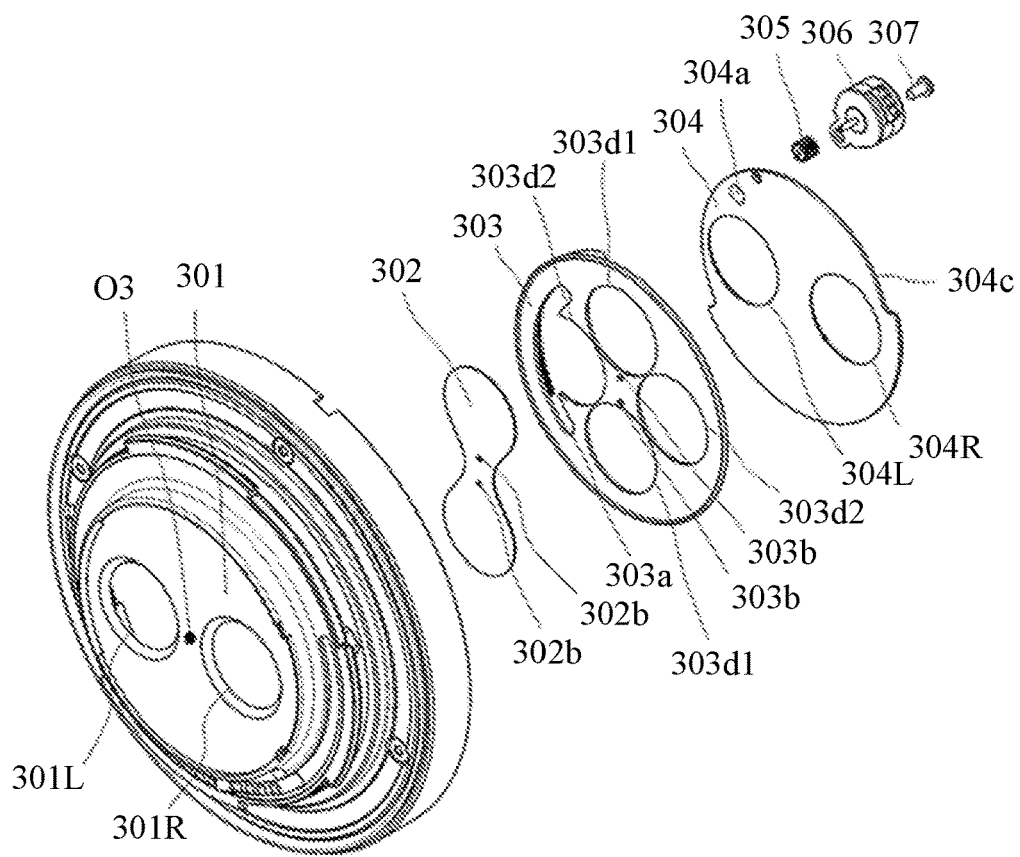

A filter configuration of the lens mount 202 will be described below with reference to FIGS. 11A, 11B, 12A, and 12B. FIG. 11A is an exploded perspective view of the filter configuration when viewed from the object side, the filter configuration being simultaneously retracted from and moved into two openings 301L and 301R, which are formed through a mount cover 301, with respect to a rotation center at a lens mount center O3. FIG. 11B is an exploded perspective view of the filter configuration when viewed from the imaging plane side. As illustrated in FIGS. 11A and 11B, the lens mount 202 includes the mount cover 301, a filter 302, a ring member (filter holding member) 303, a cover member 304, a gear 305, a motor 306, and a screw 307. Here, the filter 302 is an ND filter for reducing an incident light amount from the lens. For example, the filter 302 may use a UV cut filter, a low-pass filter, or the like instead of the ND filter.

The mount cover 301 is disposed on the inner peripheral side of the lens mount 202 and mounted and fixed on the lens mount 202 by a non-illustrated lock click. A right-eye opening (first opening) 301R opened for the right-eye optical system 201R and a left-eye opening (second opening) 301L opened for the left-eye optical system 201L are formed through the mount cover 301. The mount cover 301 includes a motor fixing portion 301a to which the motor 306 for driving the filter 302 is fixed. The motor 306 is fixed to the motor fixing portion 301a by the screw 307.

The filter 302 has a film shape and is held to the ring member 303 when two holes 302b provided at a central part are engaged with two protrusion portions 303b provided at the ring member 303. A total of four openings, namely, two openings 303d1 and two openings 303d2 are formed through the ring member 303. The two openings 303d1 overlap the two openings 301R and 301L of the mount cover 301 when the filter 302 is inserted. The two openings 303d2 overlap the two openings 301R and 301L of the mount cover 301 when the filter 302 is retracted. The filter 302 is integrally formed such that the filter 302 is superimposed on the openings 303d1 but not superimposed on the opening 303d2. The filter 302 is disposed on the imaging plane side of the motor 306.

The ring member 303 has a long hole 303a and a power transfer portion 303c in which a gear is formed. The gear 305 is attached to an output shaft of the motor 306. The ring member 303 is rotated by 90° with respect to a rotation center at the lens mount center O3 by drive of the motor 306 when the gear 305 and the power transfer portion 303c are engaged with each other. The long hole 303a is formed as an opening of 90° or larger to avoid interference with the motor fixing portion 301a when the ring member is rotated by 90°. The four openings 303d1 and 303d2 are formed such that the openings 301R and 301L are superimposed on the openings 303d1 at one of rotation ends and are superimposed on the openings 303d2 at the other rotation end.

The ring member 303 is sandwiched between the mount cover 301 and the cover member 304. The cover member 304 is locked when a fitting portion 304a is fitted to the motor fixing portion 301a of the mount cover 301, and more specifically, is locked with a gap when the inner bottom surface of the fitting portion 304a contacts the upper surface of the motor fixing portion 301a. With the appropriate gap, the ring member 303 is fixed in the optical axis direction and rotatably sandwiched with respect to a rotation center at the lens mount center O3.

The cover member 304 has a right-eye opening 304R, a left-eye opening 304L, and a cutout 304c. The two openings 304R and 304L are disposed at positions corresponding to the right-eye optical system 201R and the left-eye optical system 201L, respectively, and are formed at positions overlapping the two openings 301R and 301L of the mount cover 301. The cutout 304c is provided to avoid interfere with the power transfer portion 303c of the ring member 303 and is formed as an opening of 180° or larger so that the ring member can rotate by 90°.

Figure 12A:
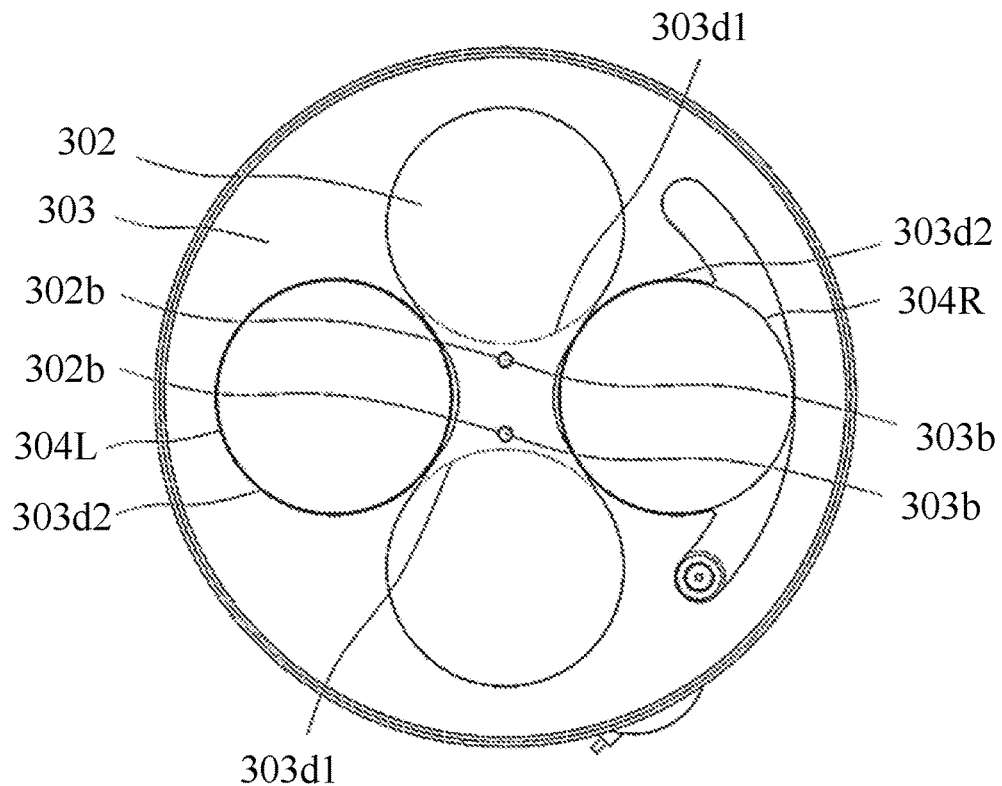
FIGS. 12A and 12B are back views of the lens apparatus in the first embodiment at filter retraction and filter insertion.
Figure 12B:
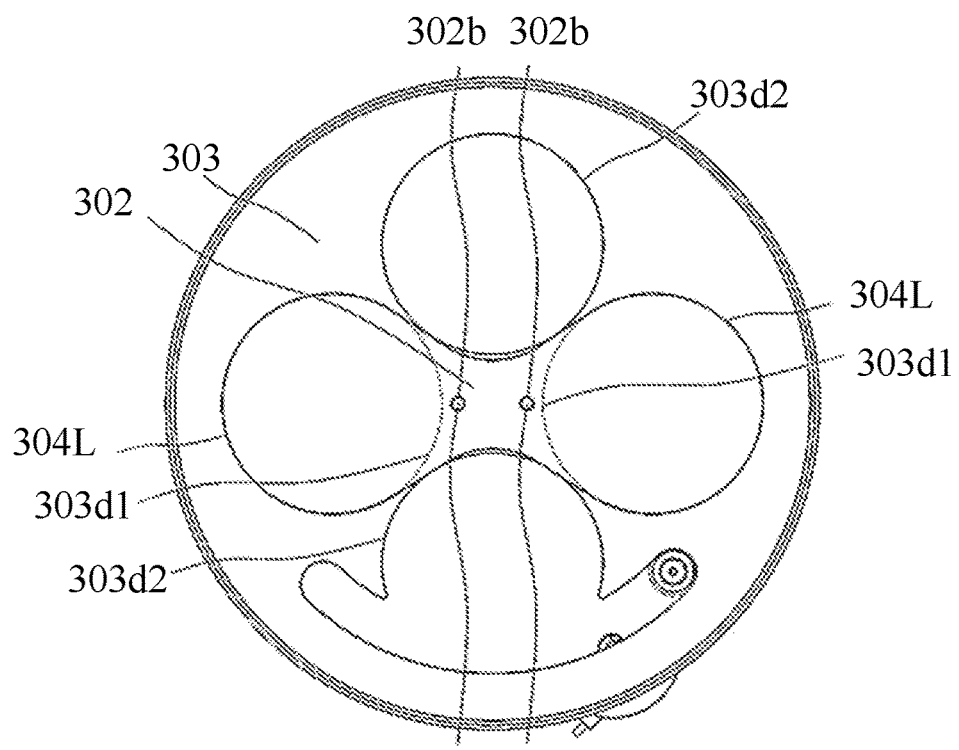

FIG. 12A is a back view illustrating a state in which the filter 302 is retracted from the two openings 304R and 304L. FIG. 12B is a back view illustrating a state in which the filter 302 is inserted into the two openings 304R and 304L. In FIG. 12A, when the openings 303d2 of the ring member 303 are superimposed on the openings 304L and 304R of the cover member 304, the filter 302 is retracted from the openings 304R and 304L. When the ring member 303 is rotated by 90° from the filter retracted state by motor drive, the filter 302 is rotated by 90° and inserted into the openings 304R and 304L as illustrated in FIG. 12B. With this configuration, the filter 302 can be simultaneously inserted into or retracted from two openings at different phases.

In this embodiment, the filter retracted state and the filter inserted state are switched when the ring member 303 is rotated by 90°, but the present disclosure is not limited thereto. Moreover, in this embodiment, the ring member 303 is rotated by motor drive, but the ring member 303 may be provided with a knob through which the ring member 303 can be manually operated from the outside.

Second Embodiment

A filter configuration in a second embodiment will be described below with reference to FIGS. 13A, 13B, 14A, and 14B. In this embodiment, description common to description in the first embodiment is omitted.

Figure 13A:
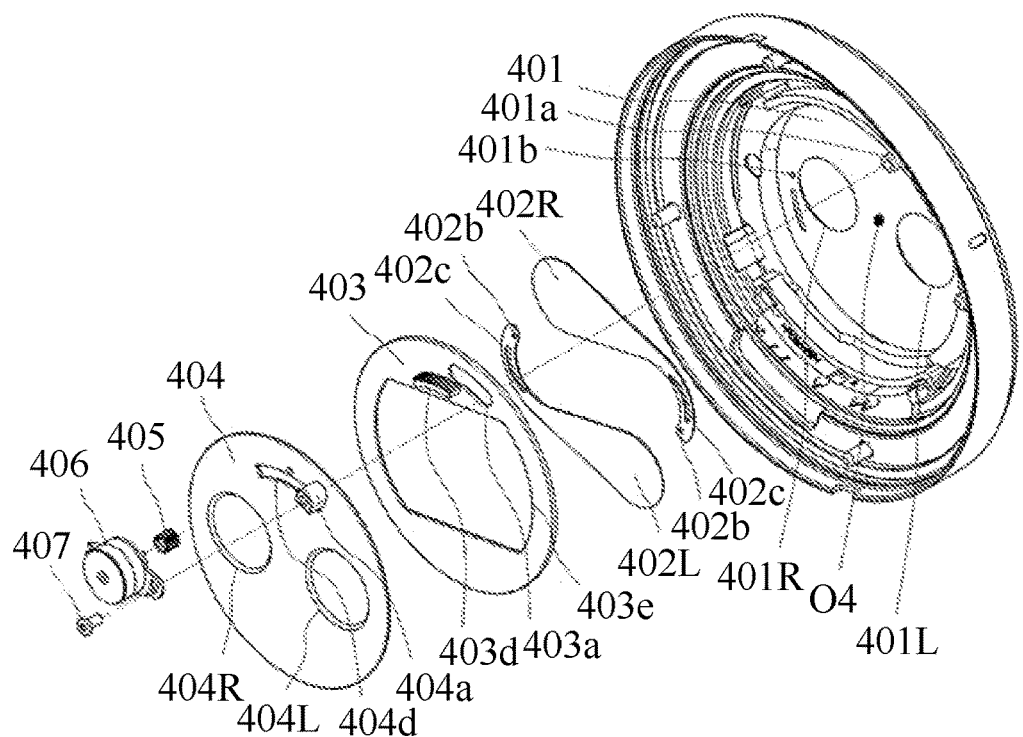
FIGS. 13A and 13B are exploded perspective views of a filter configuration in a second embodiment.
Figure 13B:
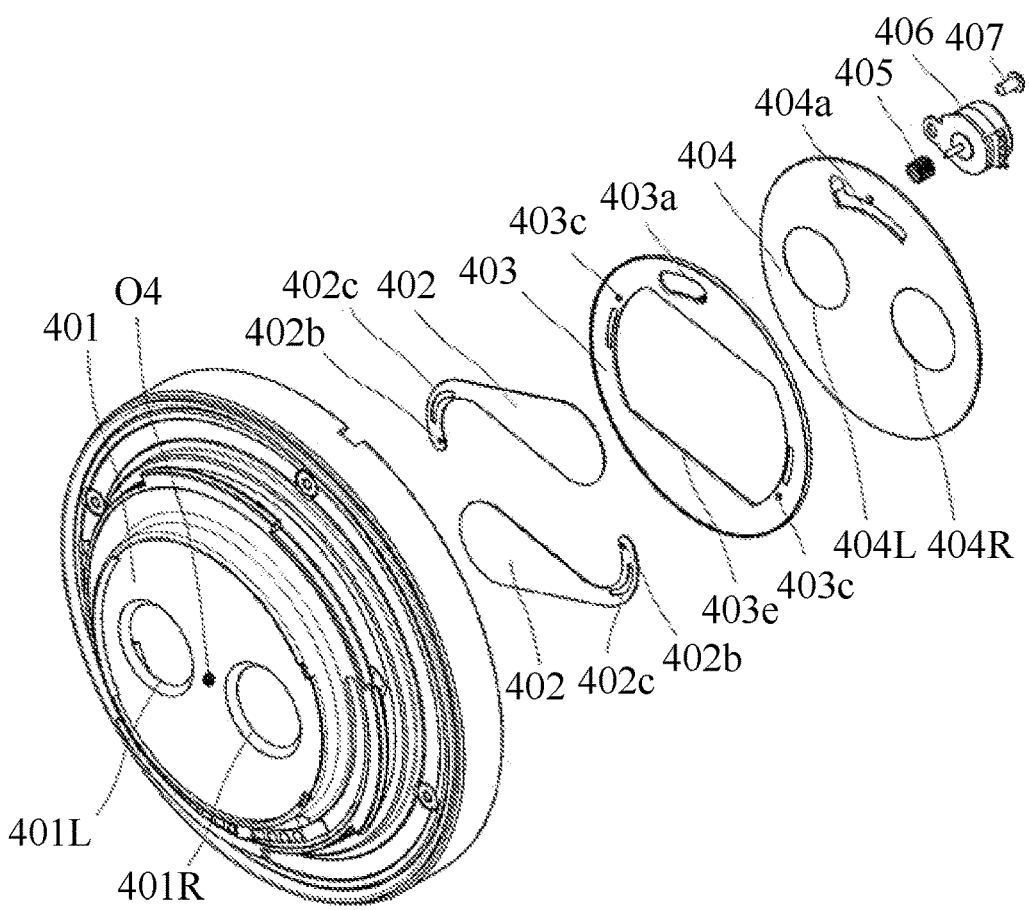

FIG. 13A is an exploded perspective view of a filter configuration when viewed from the object side, in which filters 402 (402R and 402L) each having a blade shape and including a cam groove are simultaneously retracted from or inserted into two openings 401R and 401L provided through a mount cover 401. FIG. 13B is an exploded perspective view of the filter configuration when viewed from the imaging plane side. The lens mount 202 includes the mount cover 401, the two filters 402R and 402L, a ring member (filter holding member) 403, a cover member 404, a gear 405, a motor 406, and a screw 407.

The mount cover 401 includes two protrusion portions 401b in addition to the openings 401R and 401L and a motor fixing portion 401a. The two members 402R and 402L constitute a filter, and respective engagement holes 402b thereof are engaged with the protrusion portions 401b. The filters 402R and 402L have the same shape and are disposed at point symmetric positions with respect to a lens mount center O4. The filters 402R and 402L are disposed on the imaging plane side of the motor 406. The filters 402R and 402L each include a cam groove 402c and are engaged with two cam followers 403c, respectively, provided at the ring member 403. The ring member has an opening 403e. The opening 403e and the openings 401R and 402L of the mount cover are formed without superimposition in the range of rotation of the ring member 403. Here, the filters 402R and 402L are ND filters. The two ND filters may have different densities. For example, a UV cut filter, a low-pass filter, or the like may be used instead of the ND filter.

The other configuration is the same as in the first embodiment. The ring member 403 includes a long hole 403a penetrating through the motor fixing portion 401a, and a power transfer portion 403d at which a gear is formed. The long hole 403a is formed as an opening having a size larger than the rotation angle of the ring member 403 to avoid interference with the motor fixing portion 401a. The power transfer portion 403d is engaged with the gear 405, and the ring member 403 is rotated by drive of the motor 406. The cover member 404 includes a fitting portion 404a and a through-hole portion 404d. The fitting portion 404a is fitted to two openings 404R and 404L superimposed on the openings 401R and 401L, respectively, and is fixed to the mount cover 401 the motor fixing portion 401a. The through-hole portion 404d penetrates through the power transfer portion 403d. The mount cover 401 and the cover member 404 are locked with a gap when the inner bottom surface of the fitting portion 304a contacts the upper surface of the motor fixing portion 301a. Accordingly, the ring member 403 is fixed in the optical axis direction and rotatably sandwiched with respect to a rotation center at the lens mount center O3. The through-hole portion 404d is formed as an opening having a size equal to or larger than twice of the rotation angle of the ring member 403 to avoid interference with the power transfer portion 403d.

Figure 14A:
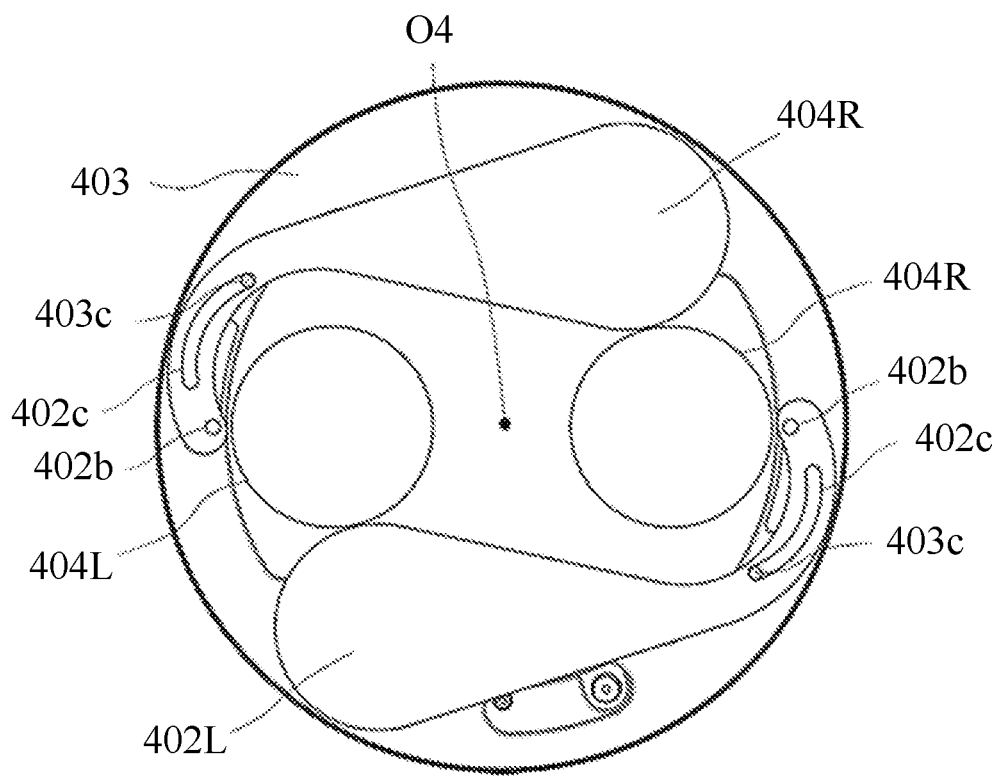
FIGS. 14A and 14B are back views of the lens apparatus in the second embodiment at filter retraction and filter insertion.
Figure 14B:
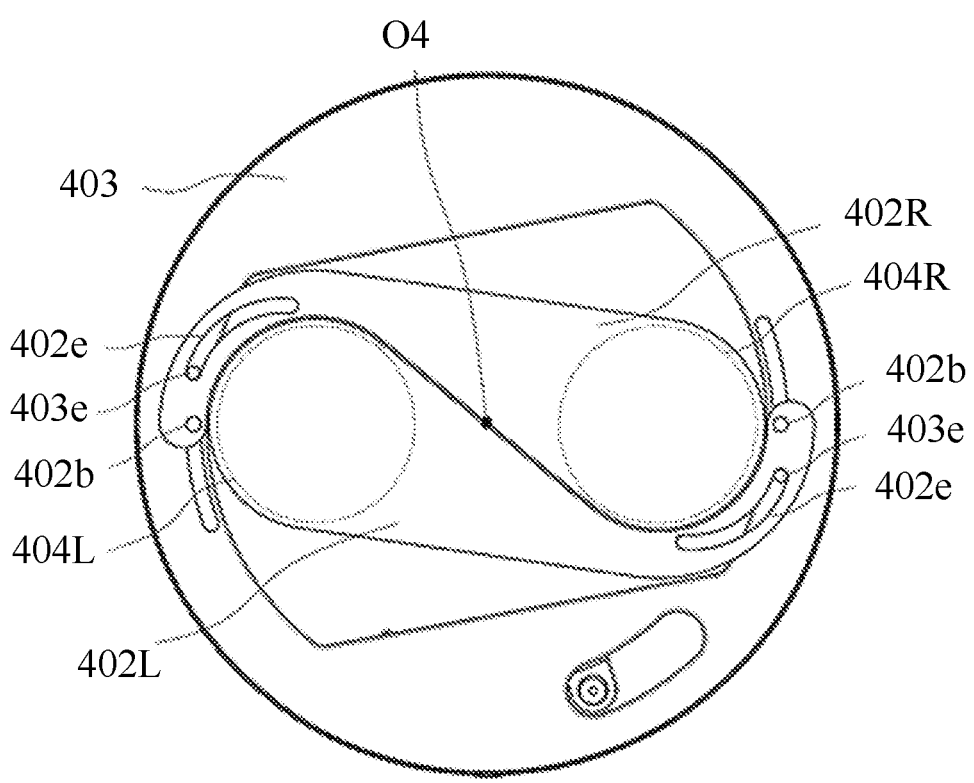

FIG. 14A is a back view illustrating a state in which the filters 402R and 402L are retracted from the two openings 404R and 404L. FIG. 14B is a back view illustrating a state in which the filters 402R and 402L are inserted into the two openings 404R and 404L.

As illustrated in FIGS. 14A and 14B, the two cam followers 403c move along the cam grooves 402c of the filters 402R and 402L, respectively, as the ring member 403 is rotated with respect to a rotation center at the lens mount center O4. As a result, rotational force is transferred to the filters 402R and 402L. In FIG. 14A, at one movement end of the cam followers 403c, the filter 402R is retracted upward from the opening 404R on the right side, and simultaneously, the filter 402L is retracted downward from the opening 404L on the left side. As the ring member 403 is rotated from this state by motor drive, the filter 402R is inserted into the opening 404R along the corresponding cam follower 403c, and simultaneously, the filter 402L is inserted into the opening 404L as illustrated in FIG. 14B. Accordingly, the filters can be simultaneously inserted into or retracted from two openings at different phases.

In this embodiment, the ring member 403 is rotated by motor drive, but the ring member may be provided with a knob through which the ring member can be manually operated from the outside.

Third Embodiment

A filter configuration in a third embodiment will be described below with reference to FIGS. 15A, 15B, 16A, and 16B. In this embodiment, description common to description in the above-described embodiments is omitted.

Figure 15A:
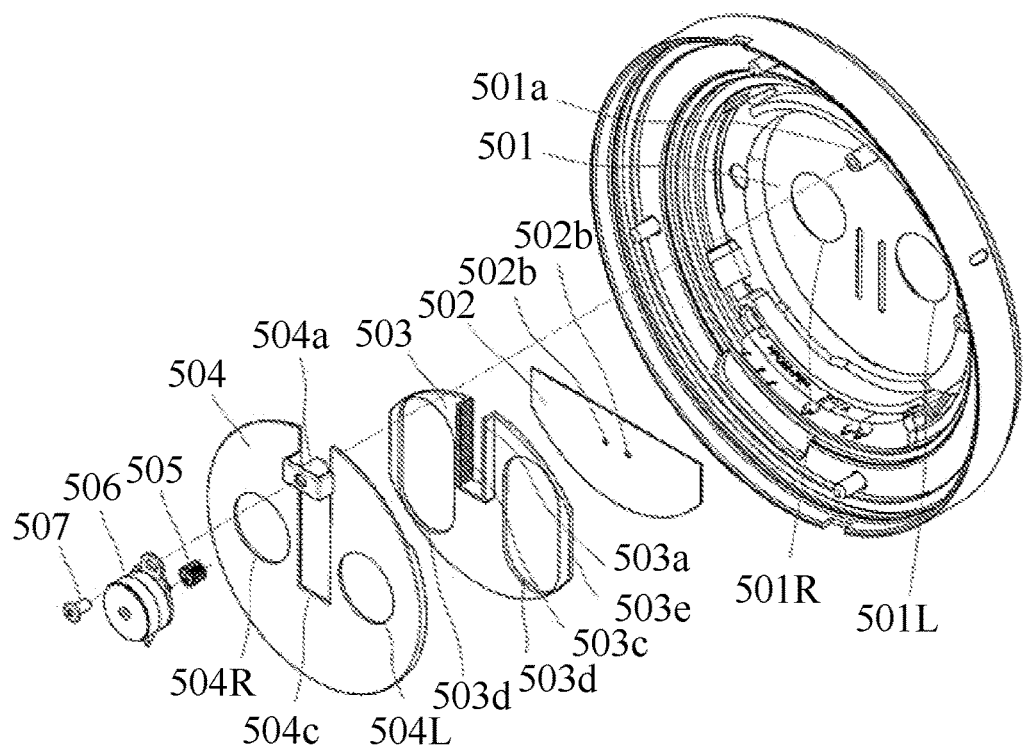
FIGS. 15A and 15B are exploded perspective views of a filter configuration in a third embodiment.
Figure 15B:
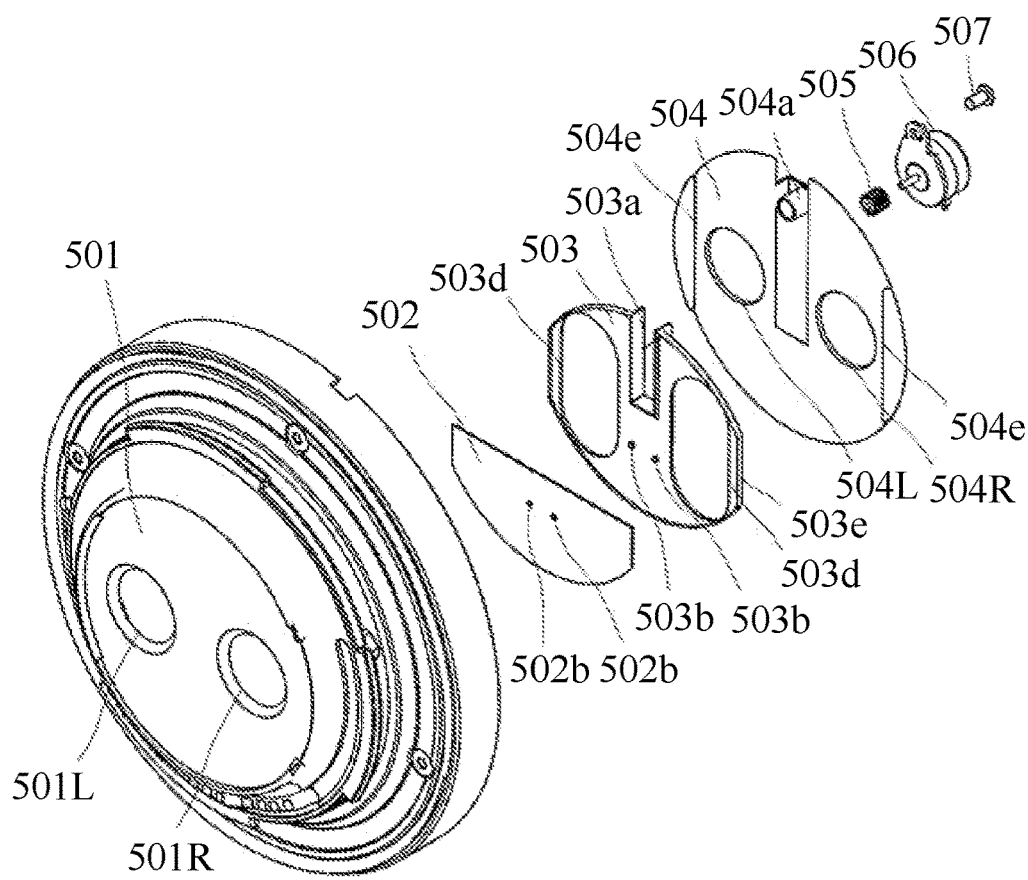

FIG. 15A is an exploded perspective view of a filter configuration when viewed from the object side, in which a filter 502 is simultaneously retracted from or inserted into two openings 501R and 501L provided through a mount cover 501 in a direction orthogonal to a line segment connecting the centers of the two openings. Here, the filter 502 is an ND filter. For example, a UV cut filter, a low-pass filter, or the like may be used instead of the ND filter. FIG. 15B is an exploded perspective view of the filter configuration when viewed from the imaging plane side. The lens mount 202 includes the mount cover 501, the filter 502, a translation member (filter holding member) 503, a cover member 504, a gear 505, a motor 506, and a screw 507.

The mount cover 501 includes the openings 501R and 50IL and a motor fixing portion 501a, and the motor 506 is fixed to the motor fixing portion 501a by the screw 507. The filter 502 has two holes 502b and is engaged and held with two protrusion portions 503b provided through the translation member 503. The filter 502 is formed long in the right-left direction and short in the up-down direction so that the filter 502 can simultaneously block openings 504R and 504L and can be retracted in the up-down direction. The filter 502 is disposed on the imaging plane side of the motor 506. The translation member 503 has two openings 503d, and the filter 502 is disposed to partially block the two openings 503d. The translation member 503 additionally includes a straight guiding portion 503e. When moved while the straight guiding portion 503e is in contact with a straight guiding portion 504e provided at the cover member 504, the translation member 503 is regulated in a direction connecting the centers of the two openings 501R and 50IL and can be moved only in a direction orthogonal to the connecting direction.

The other configuration is the same as in the first embodiment. The translation member 503 has a long hole 503a penetrating through the motor fixing portion 501a, and a power transfer portion 503c at which a rack gear is formed. The long hole 503a is formed as an opening having a size equal to or larger than the moving amount of the translation member 503 to avoid interference with the motor fixing portion 501a. The power transfer portion 503c is engaged with the gear 505, and the translation member 503 is translated by drive of the motor 506. The cover member 504 has the two openings 504R and 504L that are superimposed on the openings 501R and 50IL, respectively, a fitting portion 504a fitted to the motor fixing portion 501a and fixed to the mount cover 501, and a through-hole portion 504d penetrating through the power transfer portion 503d. The mount cover 501 and the cover member 504 are locked with a gap when the inner bottom surface of the fitting portion 504a contacts the upper surface of the motor fixing portion 501a. Accordingly, the translation member 503 is fixed in the optical axis direction and movably sandwiched in a direction orthogonal to the direction connecting the centers of the two openings 501R and SOIL. The through-hole portion 504d is formed as an opening having a size equal to or larger than twice of the moving amount of the translation member 503 to avoid interference with the power transfer portion 503d.

Figure 16A:
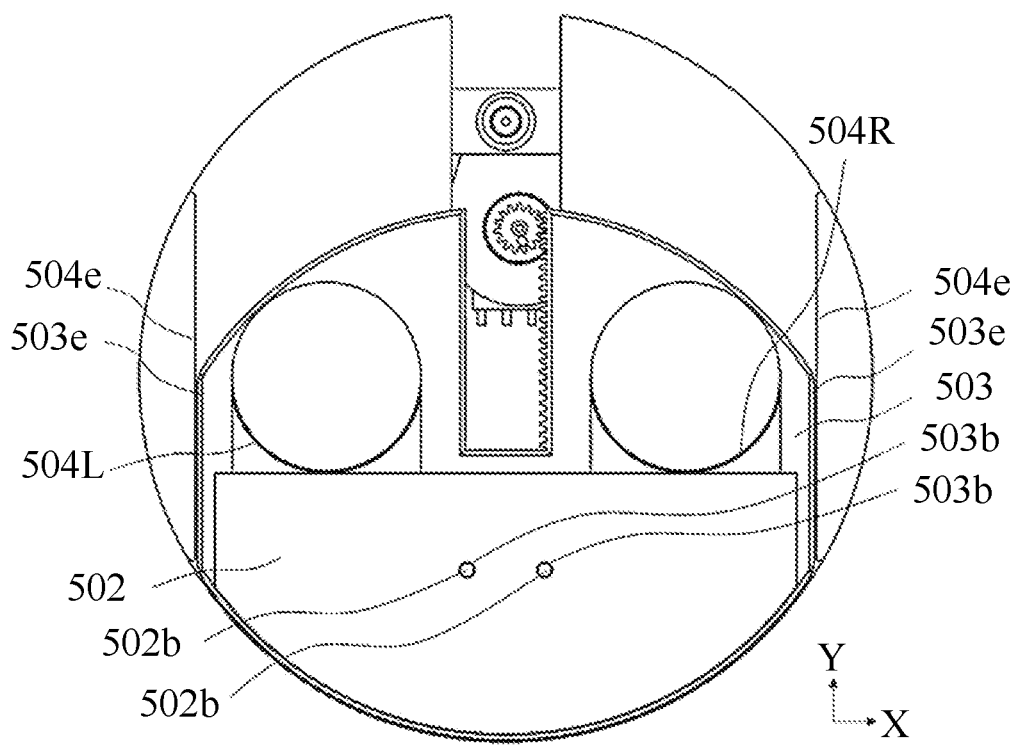
FIGS. 16A and 16B are back views of the lens apparatus in the third embodiment at filter retraction and filter insertion.
Figure 16B:
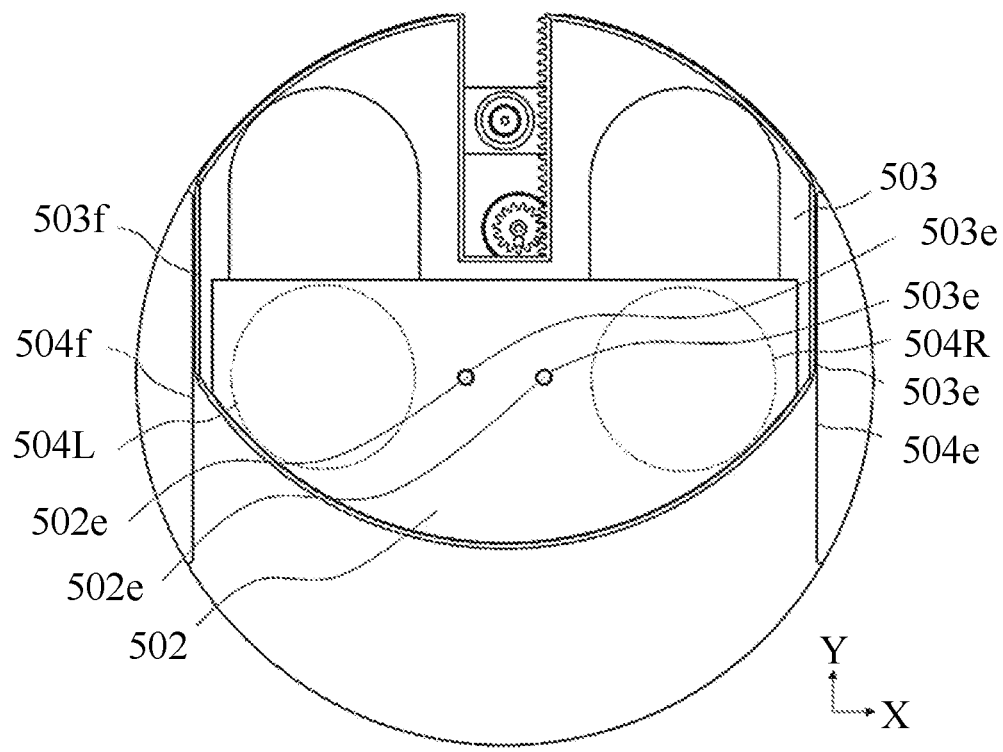

FIG. 16A is a back view illustrating a state in which the filter 502 is retracted from the two openings 501R and 501L. FIG. 16B is a back view illustrating a state in which the filter 502 is inserted into the two openings 501R and 501L.

As illustrated in FIG. 16A, the filter 502 is retracted from the openings 504R and 504L in the Y direction. When the motor 506 is driven in the filter retracted state, the translation member 503 and the filter 502 are integrally translated in the Y direction through the gear 505. The filter 502 has a shape that covers the two openings as described above, and is simultaneously inserted into the two openings 504R and 504L as illustrated in FIG. 16B. Accordingly, the filter can be simultaneously inserted into or retracted from two openings at different phases.

In this embodiment, the translation member is rotated by motor drive, but the translation member may be provided with a knob through which the ring member can be manually operated from the outside.

Fourth Embodiment

A fourth embodiment will be described below with reference to FIGS. 17A, 17B, 17C, 18A, 18B, 18C, 19A, 19B, and 19C. In this embodiment, description common to description in the above-described embodiments is omitted.

Figure 17A:
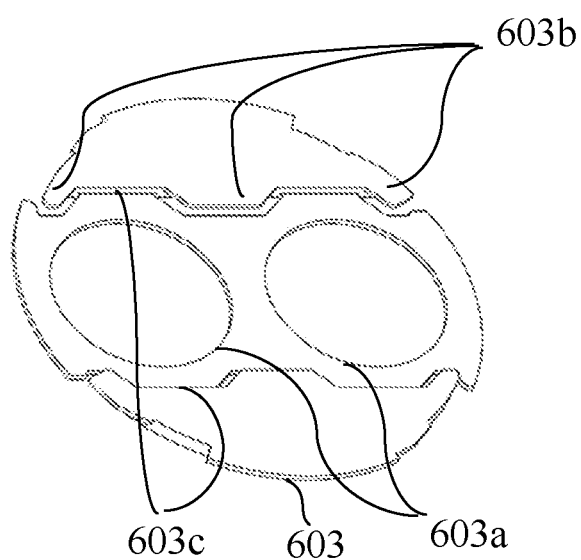
FIGS. 17A, 17B, and 17C are perspective views of a filter holder in a fourth embodiment.
Figure 17B:
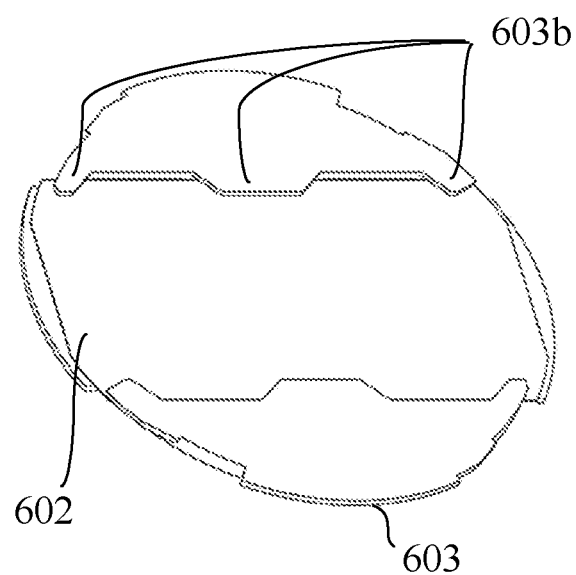
Figure 17C:
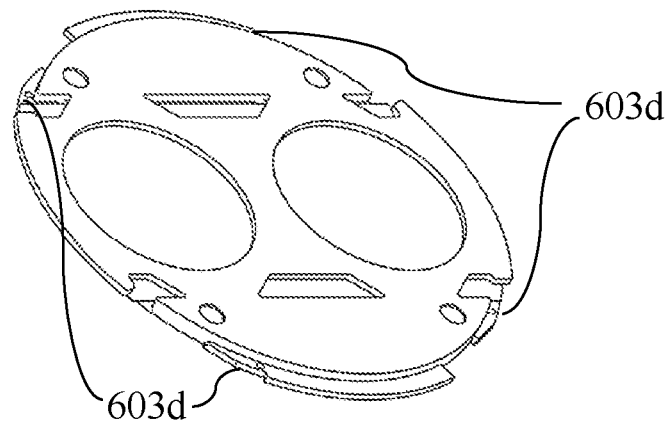

FIG. 17A is a perspective view of a filter holder (filter holding member) 603. FIG. 17B is a perspective view of the filter holder 603 to which a filter 602 is attached. Here, the filter 602 is an ND filter. For example, a UV cut filter, a low-pass filter, or the like may be used instead of the ND filter. FIG. 17C is a perspective view when FIG. 17B is viewed from the opposite side. Reference numeral 603a denote two openings that are formed corresponding to the two optical systems on the right and left sides and through which light beams pass. Reference numeral 603b denotes three filter pressers disposed on each of the upper and lower sides in the drawings. Reference numeral 603c denotes sidewalls disposed at facing positions on the upper and lower sides, respectively. As illustrated in FIG. 17B, the filter 602 is inserted and sandwiched in a slit formed by a part where the openings 603a are provided, the sidewalls 603b, and the filter pressers 603c. After the sandwiching, the user grabs the surrounding part of the filter holder 603 and thus does not need to touch the filter 602. As illustrated in FIG. 17C, four bayonet clicks 603d are integrally formed on the filter holder 603.

Figure 18A:
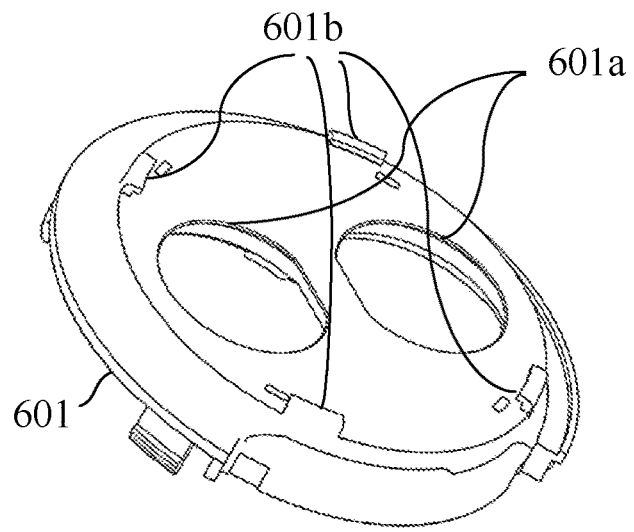
FIGS. 18A, 18B, and 18C are explanatory diagrams of a mount cover in the fourth embodiment.
Figure 18B:
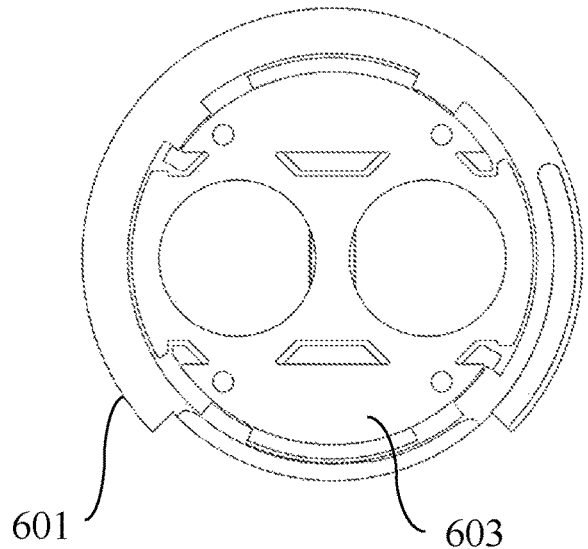
Figure 18C:
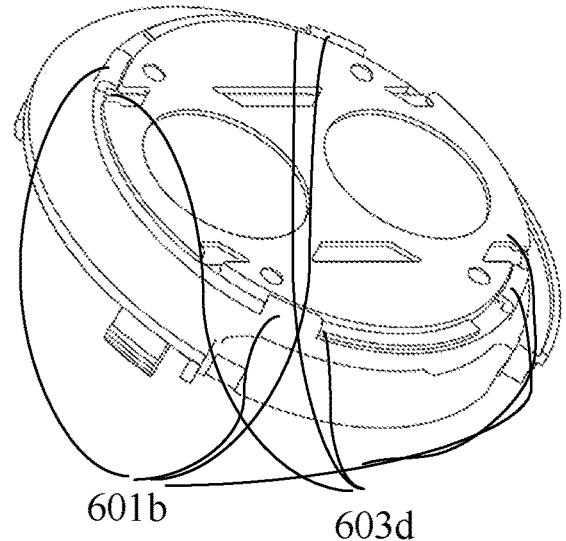

FIG. 18A is a perspective view of a mount cover 601. Bayonet click catching hooks 601b for catching the bayonet clicks 603d are integrally formed at four places on the mount cover 601. FIG. 18B is a back view of the mount cover 601 on which the filter holder 603 with the filter attached is mounted. FIG. 18C is a perspective view of the mount cover 601 on which the filter holder 603 with the filter attached is mounted. As illustrated in FIGS. 18B and 18C, the bayonet clicks 603d at a flange portion of the filter holder 603 are rotated and inserted into the bayonet click catching hooks 601b of the mount cover 601 with the bayonet structure, and accordingly, the filter holder 603 and the mount cover 601 overlap in the optical axis direction. Moreover, the filter holder 603 and the mount cover 601 are fixed in a direction orthogonal to the rotational axis when the inner diameters of the bayonet clicks 603d are fitted to the outer diameters of the bayonet click catching hooks 601b. With this configuration, the user can attach the filter 602 to the mount cover 601 on the image plane side of the lens apparatus 200 without directly touching the filter 602.

Figure 19A:
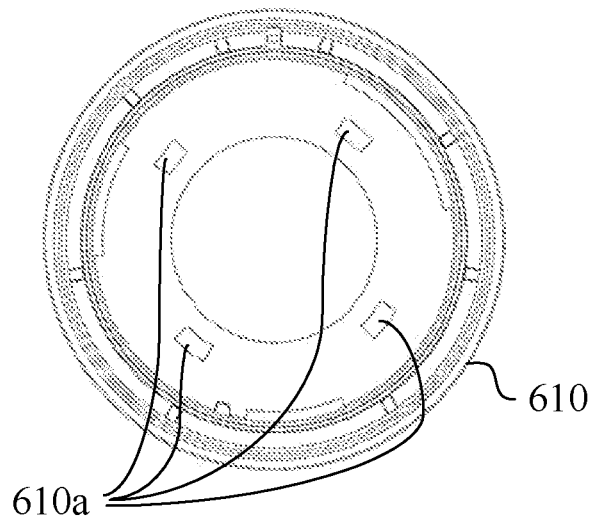
FIGS. 19A, 19B, and 19C are explanatory diagrams of a dust cap in the fourth embodiment.

FIG. 19A is a front view of a dust cap (protecting member) 610 attached to the lens mount 202 to cover the mount cover 601 and the like. Reference numeral 610a denotes four bayonet click catching hooks formed by inner slide molding in shapes equivalent to those of the bayonet click catching hooks 601b integrally formed on the mount cover 601.

Figure 19B:
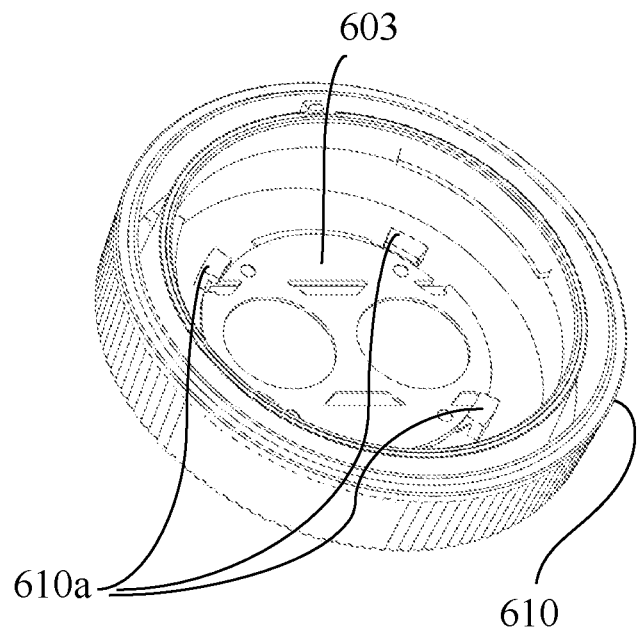

FIG. 19B is a perspective view illustrating a state in which the filter holder 603 is attached to the bayonet click catching hooks 610a of the dust cap 610. While the filter 602 is sandwiched and held in the filter holder 603, the user can house the filter 602 together with the filter holder 603 in the dust cap 610 by touching the filter holder 603 without directly touching the filter 602. The dust cap 610 for protecting the lens apparatus 200 is paired with a body cap 611 for protecting the mount portion of the camera body 110.

Figure 19C:
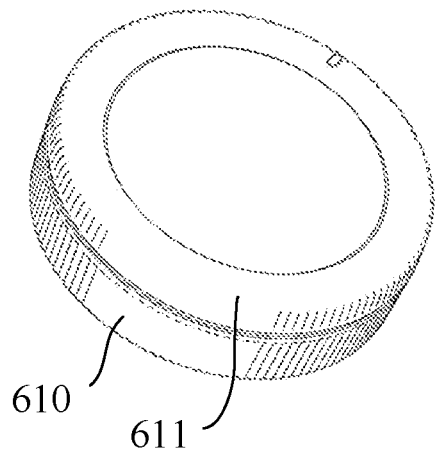

FIG. 19C is a perspective view illustrating a state in which the body cap 611 attachable to the camera body 110 is attached to the dust cap 610. As illustrated in FIG. 19C, the body cap 611 and the dust cap 610 can be rotationally fixed by a bayonet mechanism. Since the body cap 611 functions as a lid for the dust cap 610 in this manner, the filter 602 is housed and sealed inside so that adhesion of dust and the like can be prevented.

Fifth Embodiment

A fifth embodiment will be described below with reference to FIGS. 20, 21A, and 21B. This embodiment is a modification of the fourth embodiment and different in the method of fixing a filter by a filter holder. In this embodiment, description common to description in the above-described embodiments is omitted.

Figure 20:
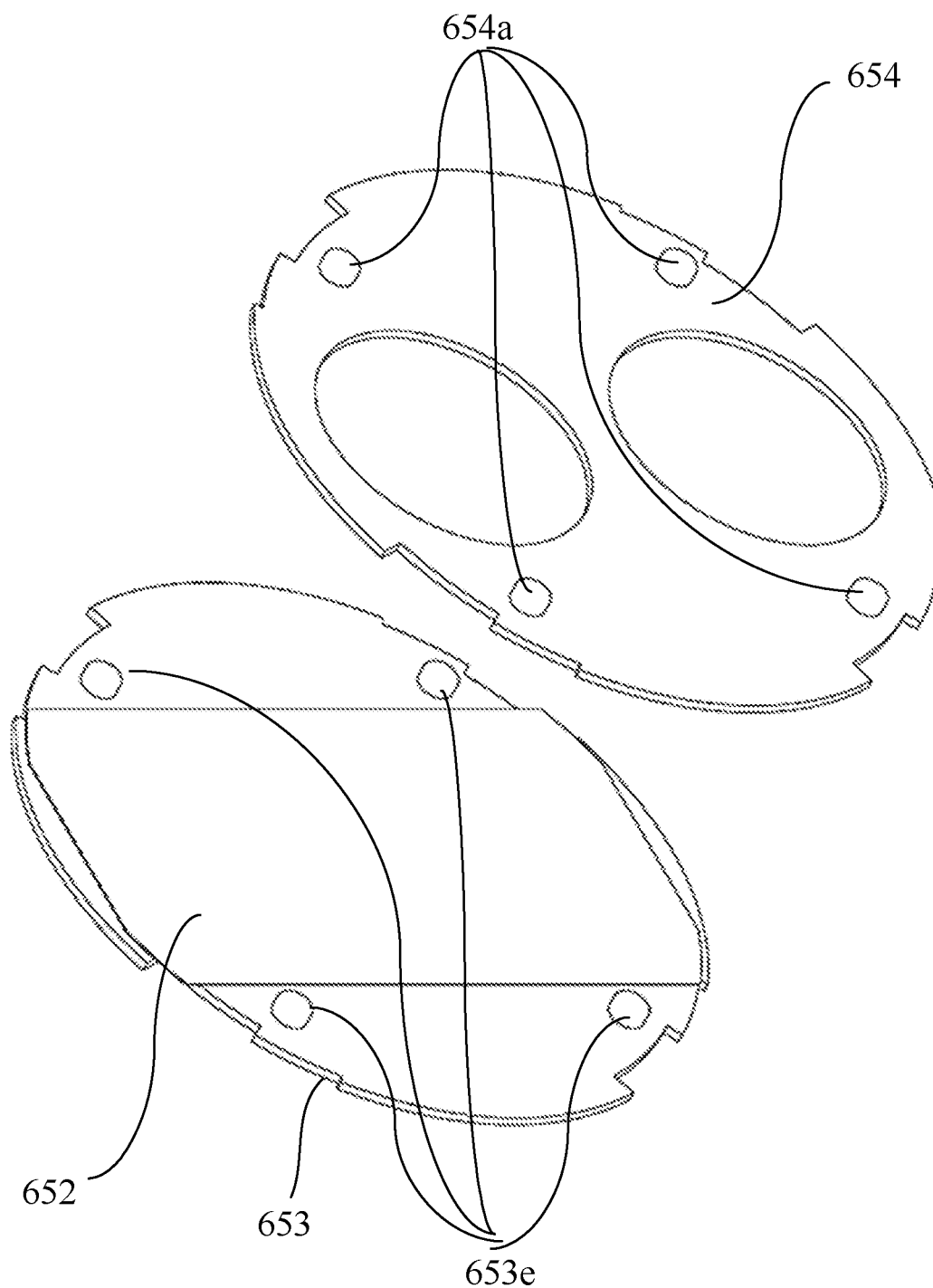
FIG. 20 is an exploded perspective view of a filter holder unit in a fifth embodiment.
Figure 21A:
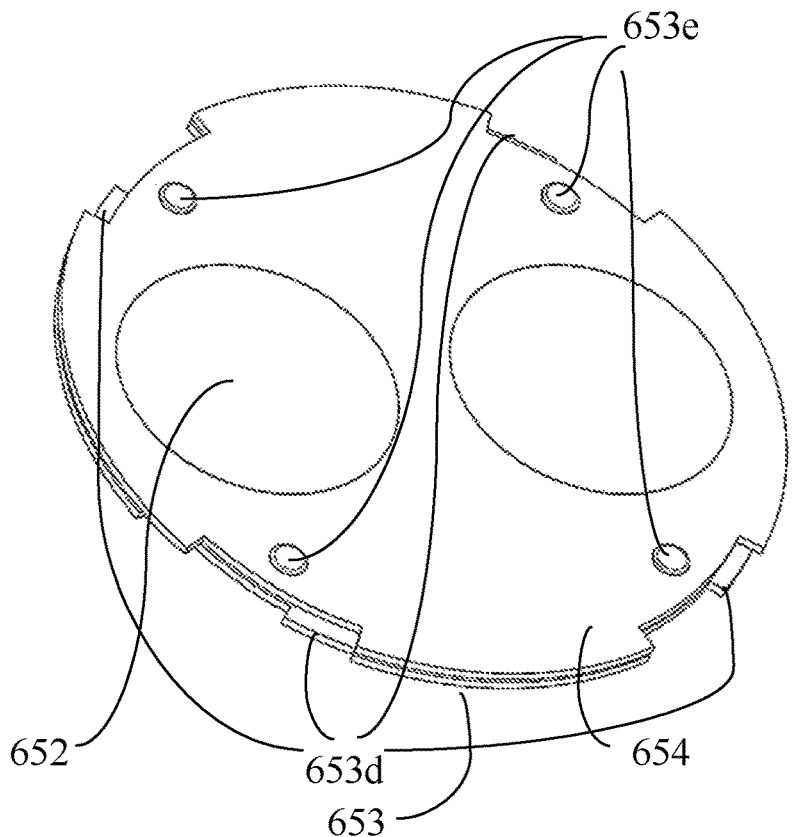
FIGS. 21A and 21B are perspective views of the filter holder unit and a mount cover in the fifth embodiment.

FIG. 20 is an exploded perspective view of a filter holder unit that holds a filter. FIG. 21A is a perspective view of the filter holder unit. FIG. 21B is a perspective view of a mount cover 651 on which the filter holder unit with a filter 652 attached is mounted. Here, the filter 652 is an ND filter. For example, a UV cut filter, a low-pass filter, or the like may be used instead of the ND filter.

As illustrated in FIG. 20, a filter holder (filter holding member) 653 and a filter holder cover (lid member) 654 are provided. The filter 652 is fixed when sandwiched between the filter holder 653 and the filter holder cover 654. Protrusions (protrusion portions) 653e are integrally shaped at four places on the filter holder 653. Holes 654a are provided through the filter holder cover 654 at positions corresponding to the protrusions 653e. The filter holder unit as illustrated in FIG. 21A can be assembled by fitting the four protrusions 653e to the holes 654a by light pressing, and accordingly, positional shift of the filter holder 653 and the filter holder cover 654 can be prevented. Moreover, since the filter holder 653 includes the protrusions 653e, the filter holder 653 can be prevented from being attached to the mount cover 651 in a flipped-over state.

Figure 21B:
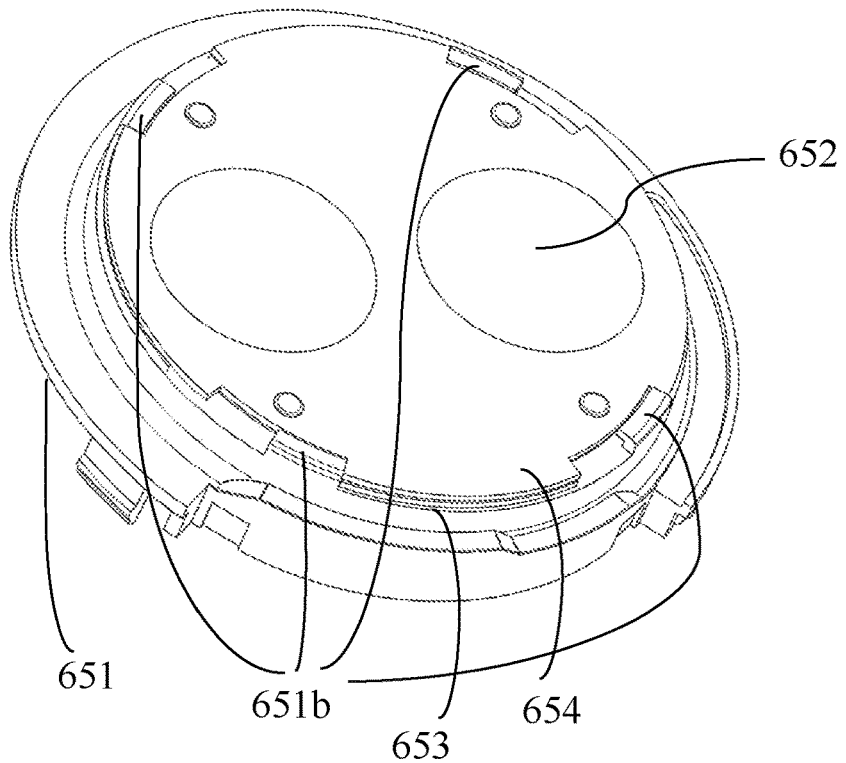

Bayonet clicks 653d are integrally formed on the filter holder 653, and thus the bayonet clicks 653d can be attached to bayonet click catching hooks 651b of the mount cover 651 by rotation as illustrated in FIG. 21B. With the same bayonet mechanism as in the fourth embodiment, the filter holder unit obtained by the assembly can be attached on the image plane side of the lens apparatus 200. The protrusions 653e protrude through the holes 654a in the filter holder unit thus assembled. With this configuration, when the filter holder unit is about to be attached in a flipped-over state, the bayonet clicks are not caught due to separation by the protrusions 653e, which prevents false assembly in a flipped-over state. As in the fourth embodiment, the filter holder unit can be housed in a mount cap and a body cap when removed.

Sixth Embodiment

A sixth embodiment will be described below with reference to FIGS. 22, 23A, 23B, and 23C. This embodiment is a modification of the fifth embodiment and different in the method of fixing a filter holder to the lens apparatus 200. In this embodiment, description common to description in the above-described embodiments is omitted.

Figure 22:
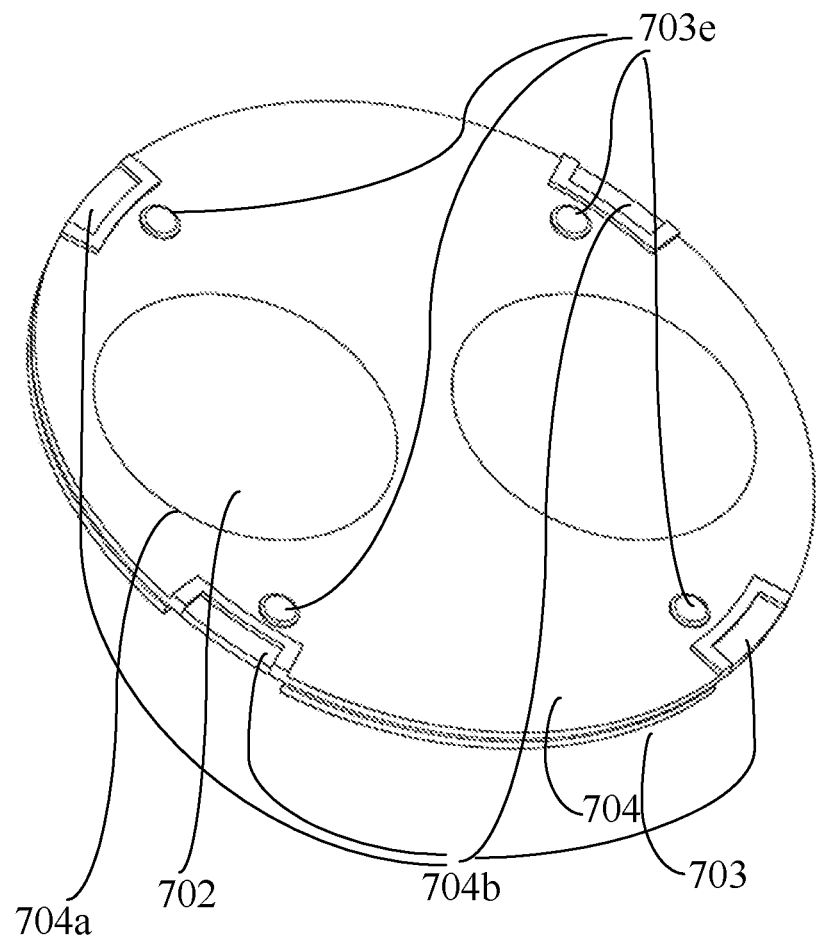
FIG. 22 is a perspective view of a filter holder unit in a sixth embodiment.
Figure 23A:
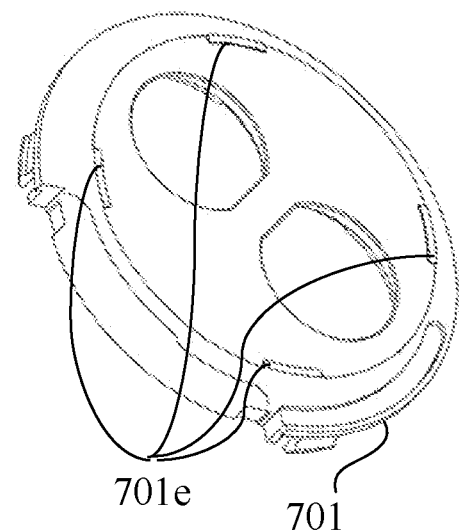
FIGS. 23A, 23B, and 23C are explanatory diagrams of a mount cover in the sixth embodiment.
Figure 23B:
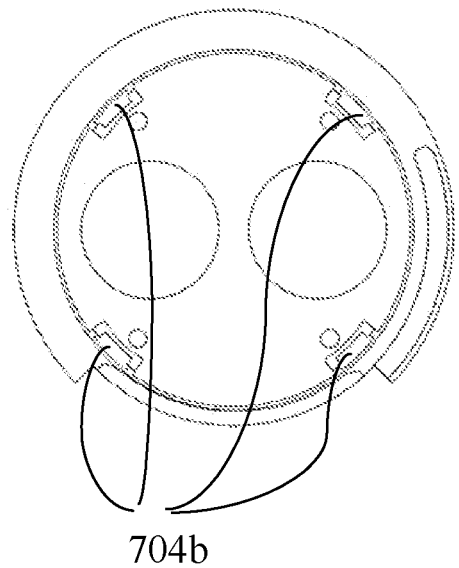
Figure 23C:
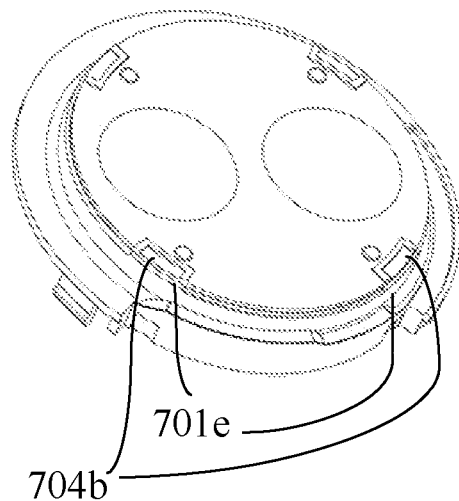

FIG. 22 is a perspective view of a filter holder unit in this embodiment. FIG. 23A is a perspective view of a mount cover 701. FIG. 23B is a back view of the mount cover 701 on which the filter holder unit with a filter attached is mounted. FIG. 23C is a perspective view of the mount cover 701 on which the filter holder unit with the filter attached is mounted.

FIG. 22 illustrates a unit in which a filter 702 is sandwiched between a filter holder cover 704 and a filter holder (filter holding member) 703 constituting a filter holding member. Here, the filter 702 is an ND filter. For example, a UV cut filter, a low-pass filter, or the like may be used instead of the ND filter. As in the fifth embodiment, the filter holder unit is assembled by fitting four protrusions 703e to holes 704a by light pressing. Difference from the fifth embodiment is that no bayonet clicks are provided at the filter holder 703 but magnets 704b are provided at the filter holder cover 704 by insert molding.

The mount cover 701 illustrated in FIG. 23A includes metal iron pieces 701e integrated at positions corresponding to the magnets 704b of the filter holder cover 704 by insert molding. As illustrated in FIGS. 23B and 23C, the magnets 704b of the filter holder unit can be fixed by attraction of magnetic force to parts where the iron pieces 701e of the mount cover 701 are positioned. Moreover, as in the fourth and fifth embodiments, when removed, the filter holder unit can be housed in a mount cap and a body cap by attaching, at corresponding positions on the mount cap side, iron pieces or the like similar to those of the mount cover 701.

Seventh Embodiment

A seventh embodiment will be described below with reference to FIGS. 24A, 24B, 25A, and 25B. This embodiment is a modification of the fourth embodiment and different in the method of fixing a filter holder to the lens apparatus 200. In this embodiment, description common to description in the above-described embodiments is omitted.

Figure 24A:
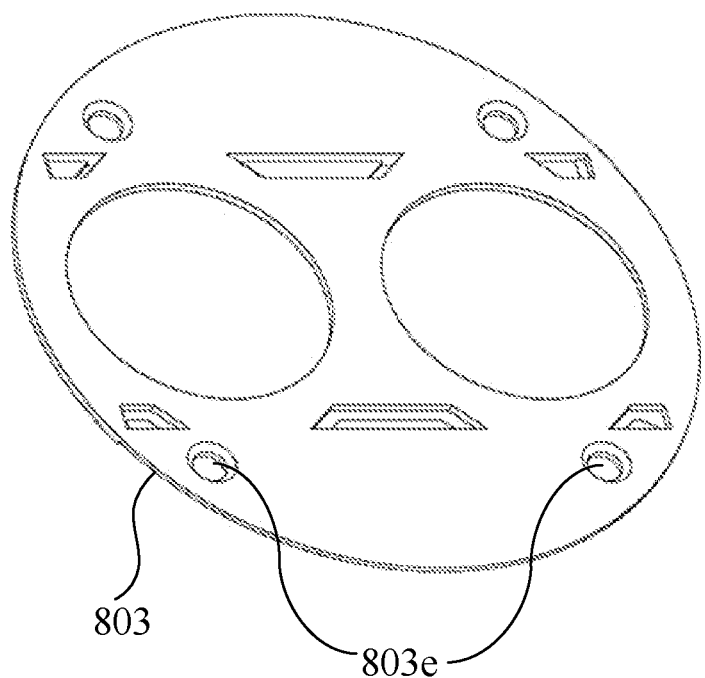
FIGS. 24A and 24B are perspective views of a filter holder in a seventh embodiment.
Figure 24B:
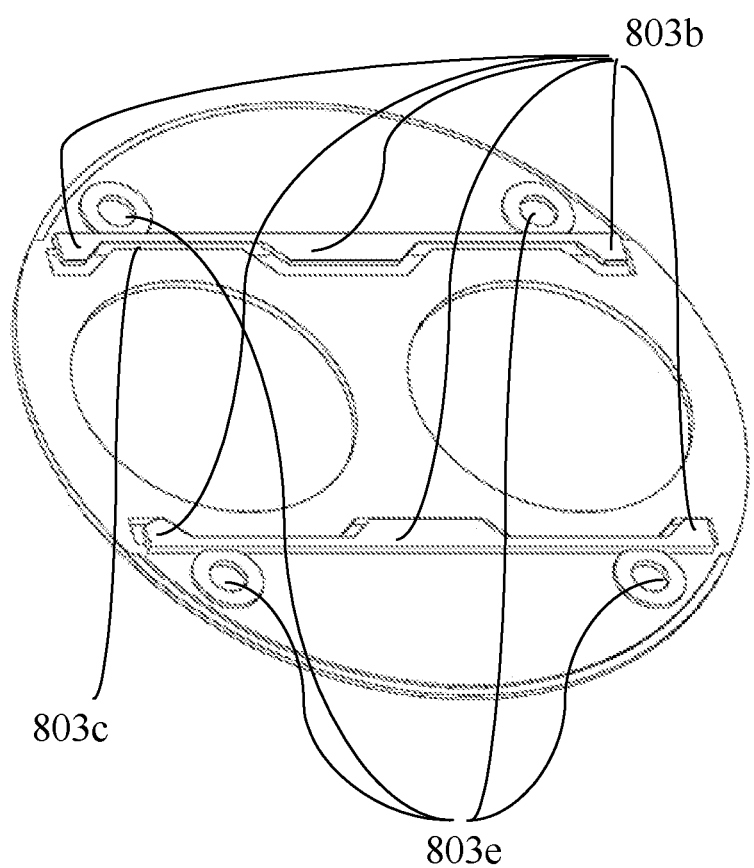
Figure 25A:
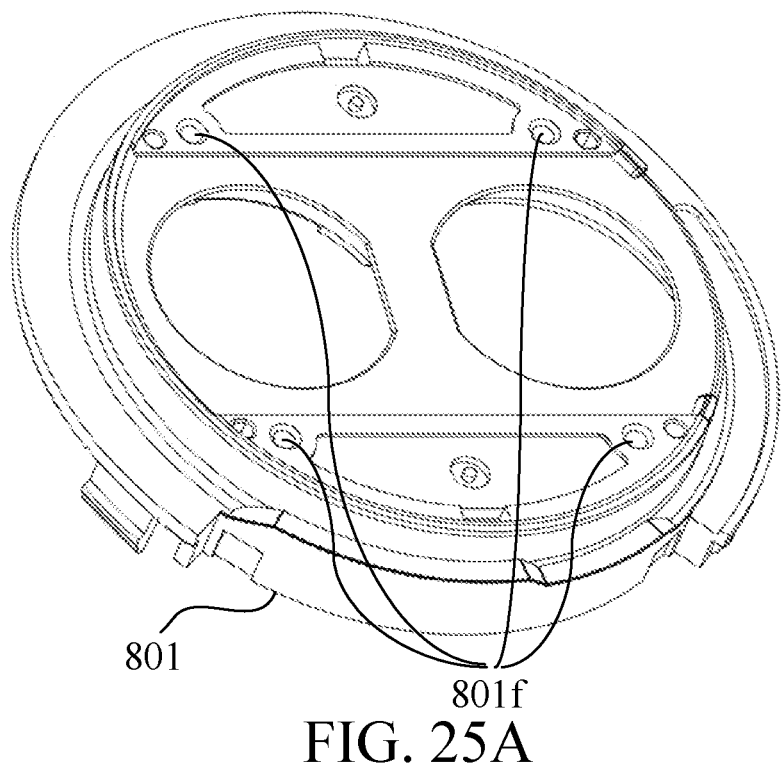
FIGS. 25A and 25B are perspective views of a mount cover and a filter holder in the seventh embodiment.
Figure 25B:
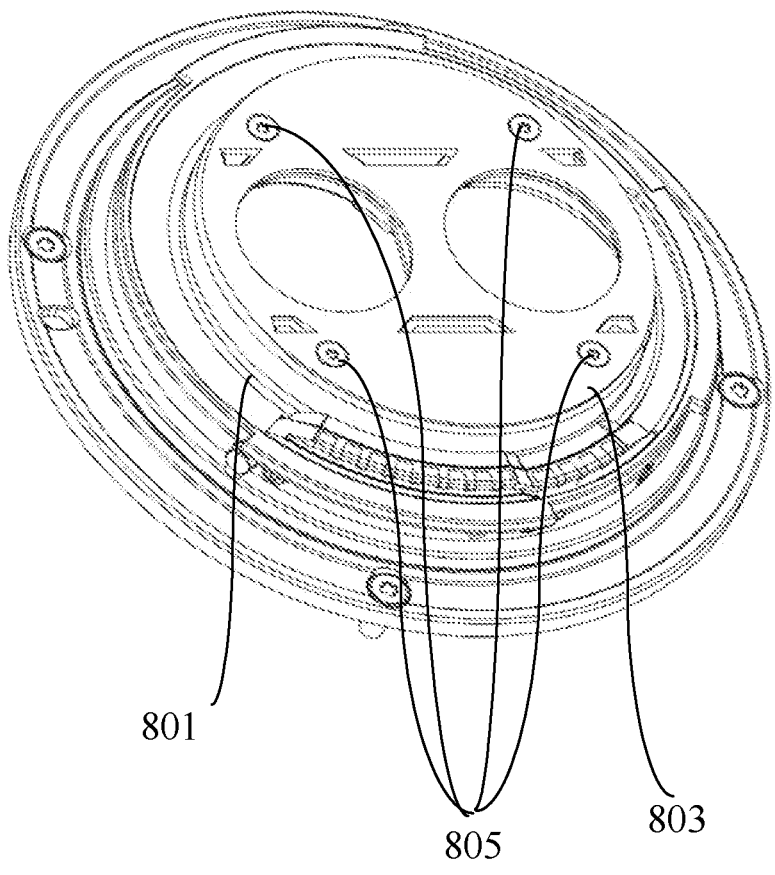

FIG. 24A is a perspective view of a filter holder (filter holding member) 803. FIG. 24B is a perspective view of the filter holder 803 when viewed in the opposite direction. FIG. 25A is a perspective view of a mount cover 801. FIG. 25B is a perspective view of the mount cover 801 on which the filter holder 803 with a filter attached is mounted.

In the filter holder 803 illustrated in FIGS. 24A and 24B, reference numeral 803b denotes filter pressers, three of which are disposed on each of the upper and lower sides in the diagrams. Reference numeral 803c denotes sidewalls disposed at facing positions on the upper and lower side. A filter 802 can be inserted and sandwiched in a slit formed by a part where openings 803a are provided, the filter pressers 803b, and the sidewalls 803c as in the fourth embodiment. Here, the filter 802 is an ND filter. For example, a UV cut filter, a low-pass filter, or the like may be used instead of the ND filter.

Reference numeral 803e denotes screw holes into which screws are inserted. As illustrated in FIG. 25A, screw seats 801f for screwing self-tapping screws are provided through the mount cover 801. As illustrated in FIG. 25B, screw-fastening fixation can be performed by fastening screws 805 to the screw seats 801f through the screw holes 803e of the filter holder 803 on which the filter 802 is mounted. Moreover, as in the fourth embodiment or the like, when removed, the filter holder unit can be housed in a mount cap and a body cap and fixed by screw fastening by providing, at corresponding positions on the mount cap side, screw seats similar to those of the mount cover 801.

Eighth Embodiment

Referring now to FIGS. 26A to 28, a description will be given of an eighth embodiment. This embodiment is a modification of the fifth embodiment, and changes the method of fixing the filter to the filter holder. This embodiment will omit a description common to each of the above embodiments.

Figure 26C:
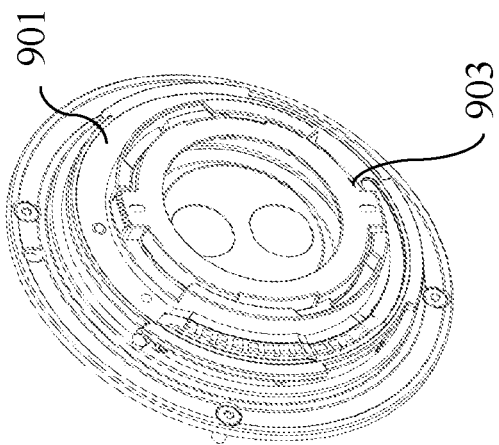
FIGS. 26A, 26B, and 26C are perspective views of a filter holder unit and a mount cover according to an eighth embodiment.
Figure 26B:
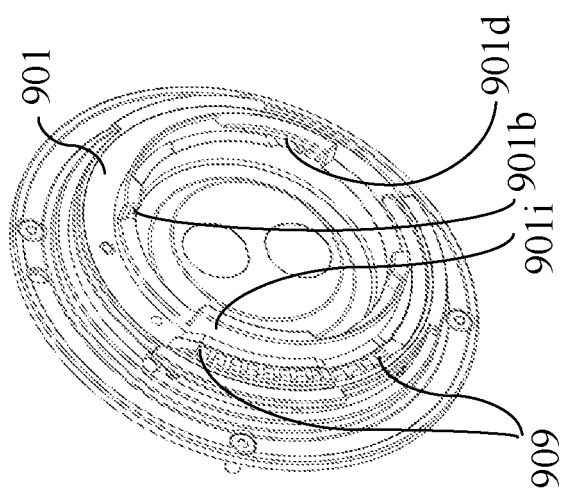
Figure 26A:
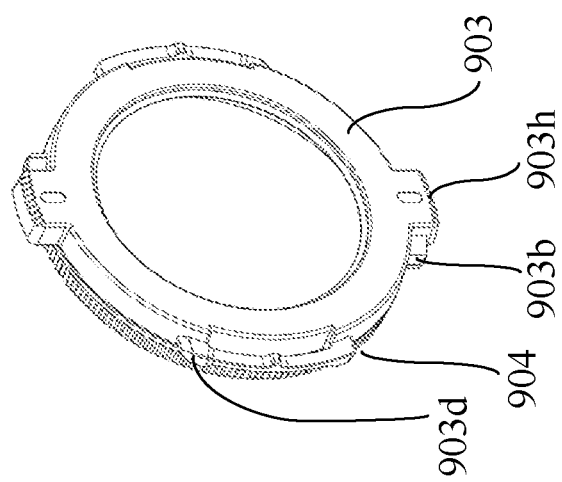
Figure 27A:
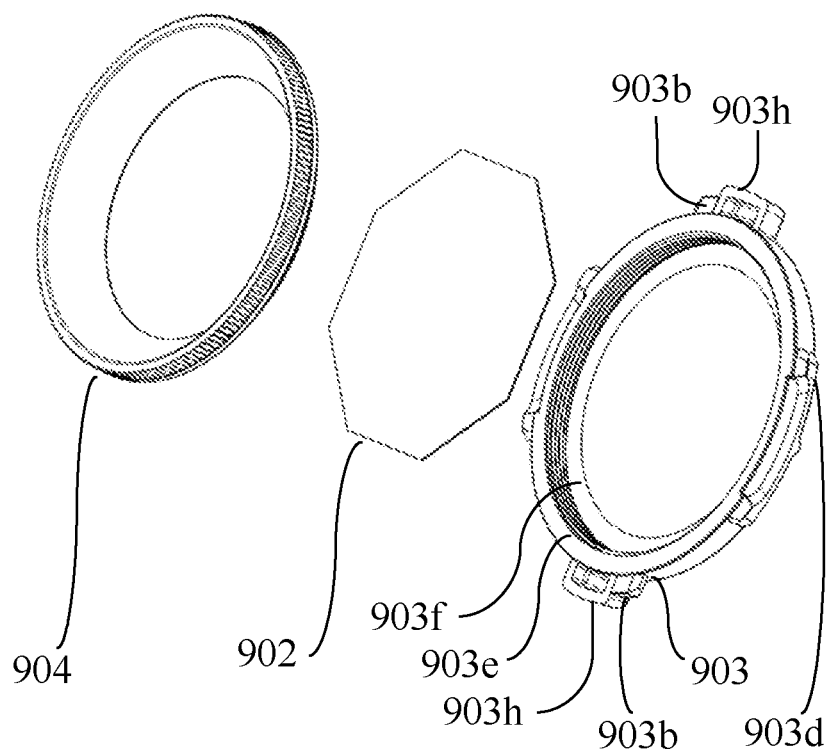
FIGS. 27A and 27B are exploded perspective views of the filter holder unit according to the eighth embodiment.
Figure 27B:
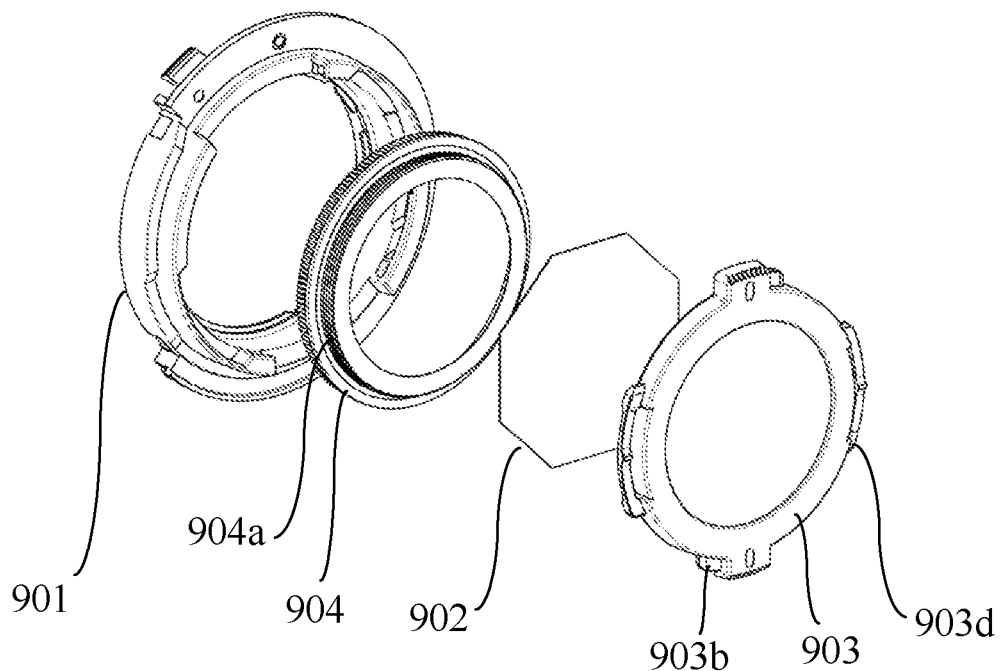
Figure 28:
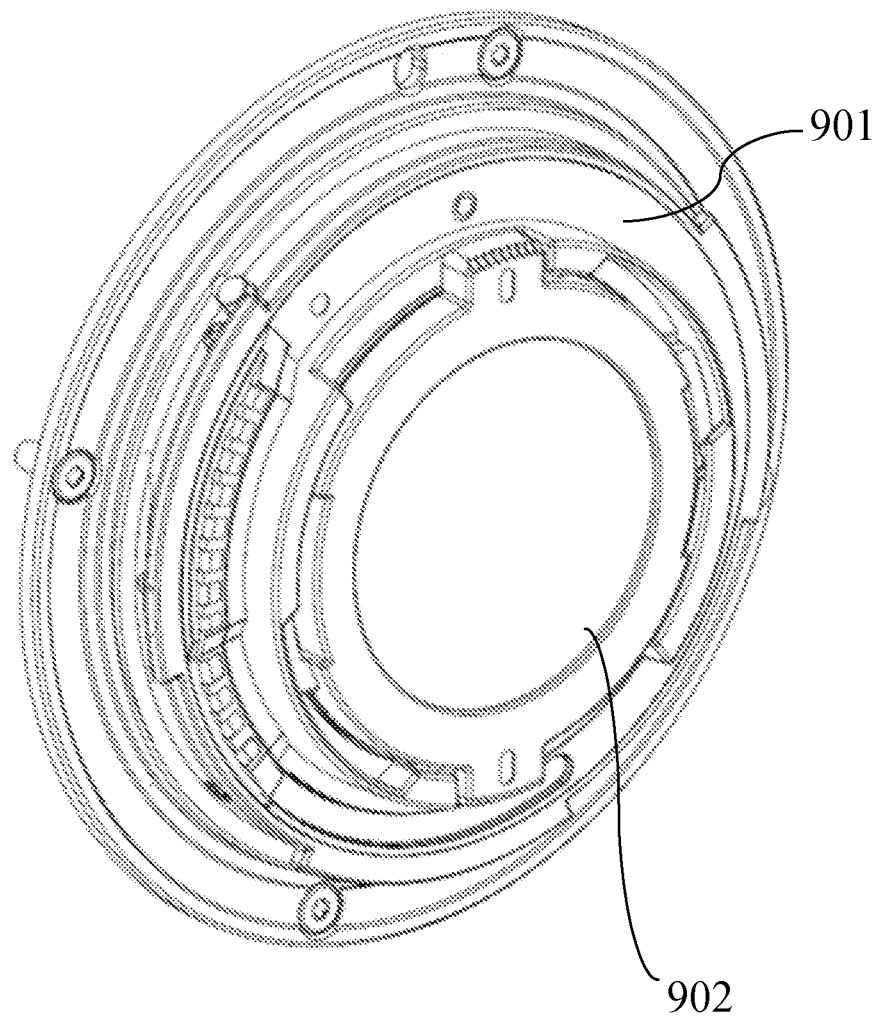
FIG. 28 is a perspective view of the filter holder unit and the mount cover according to the eighth embodiment.

FIG. 26A is a perspective view of a filter holder unit that holds a filter 902. Here, the filter 902 is an ND filter. For example, a UV cut filter, a low-pass filter, or the like may be used instead of the ND filter. FIG. 26B is a perspective view of a mount cover 901 at the rear end of the interchangeable lens. FIG. 26C is an overall perspective view including the mount cover 901 with the filter holder unit that does not include the filter 902. FIGS. 27A and 27B are exploded perspective views of the filter holder unit that holds the filter 902. FIG. 27B illustrates only a bayonet mechanism portion of the mount cover 901. FIG. 28 is an overall perspective view including the mount cover 901 mounted with the filter holder unit that includes the filter 902.

As illustrated in FIGS. 27A and 27B, the filter 902 is sandwiched between a filter holder (first member) 903 and a filter holder cover (press ring, second member) 904 and thus fixed. In this embodiment, the filter holder 903 and the filter holder cover 904 are filter holding members that hold the filter 902. As illustrated in FIG. 27A, the filter holder 903 is integrally molded with an M30.5 female screw (female thread portion) 903e, and an unthreaded flange portion 903f is provided at the end of the female screw 903e. As illustrated in FIG. 27B, the filter holder cover 904 has an M30.5 male screw (male screw portion) 904a at a position corresponding to the female screw 903e. By screwing the male screw 904a into the female screw 903e (by screwing the male screw 904a and the female screw 903e together), the filter holder unit can be structured as illustrated in FIG. 27A. The filter holder cover 904 is configured to be assembled from the object direction. A flange portion 903f determines the position of the filter holder cover 904 with respect to the filter holder 903 when the filter holder cover 904 is attached to the filter holder 903. In this embodiment, the filter 902 may be fixed by screwing it into the female screw 903e of the filter holder 903.

The filter holder 903 having the flange portion 903f can prevent the filter holder cover 904 from being screwed into the filter holder 903 inside out from the opposite direction of the filter holder 903. The filter holder 903 has two operating portions 903h. Integrally forming the bayonet claw 903b only on one side of each of the two operation portions 903h can prevent the filter holder 903 from being attached to the mount cover 901 inside out.

In addition to the bayonet claws 903b, the filter holder 903 is integrally formed with bayonet claws 903d, so it has totally four bayonet mechanisms. As illustrated in FIGS. 26A and 26B, the bayonet claws 903b and 903d can be attached to bayonet claw hooks 901b and 901d of the mount cover 901 by rotating them. Due to the bayonet mechanism similar to that of the fifth embodiment, the unitized filter holder unit can be attached to the image plane side of the lens apparatus 200. A stopper portion 903g protrudes in the filter holder unit state. Therefore, in an attempt to attach the filter holder unit inside out, the bayonet claw in which the stopper portion 903g protrudes floats and does not get caught, so erroneous assembly due to inside out cannot be performed. As in the fifth embodiment, it can be stored in the mount cap and the body cap when detached.

The form of attaching a thin sheet-like filter called a gelatin filter has hitherto been described. Since the filter holder 903 is integrally formed with the M30.5 female thread 903e, a generally commercially available, screw-in type glass filter that is thicker than the sheet-like filter can be attached.

Figure 29A:
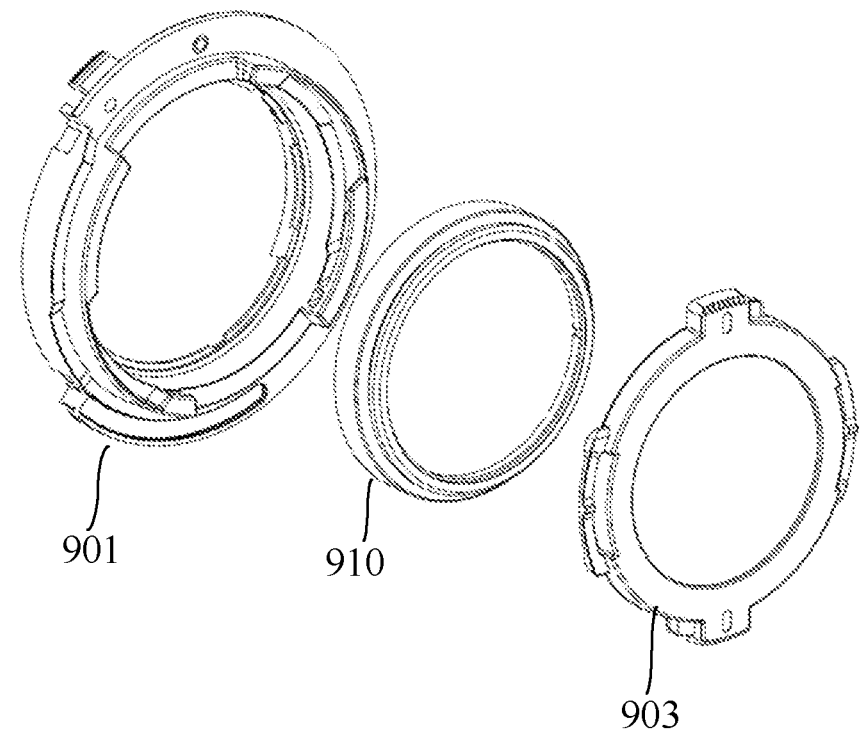
FIGS. 29A and 29B are exploded perspective views of the filter holder unit according to the eighth embodiment.
Figure 29B:
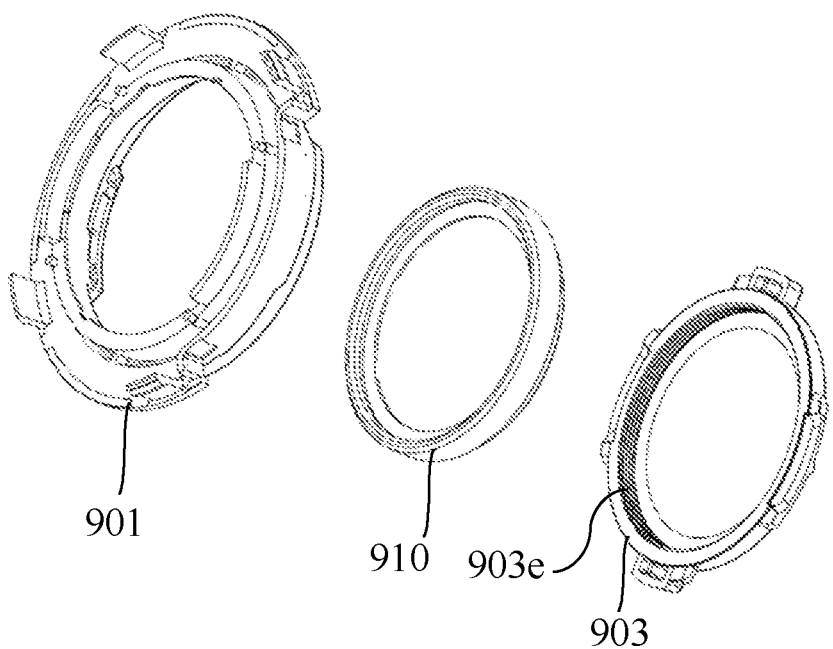
Figure 30:
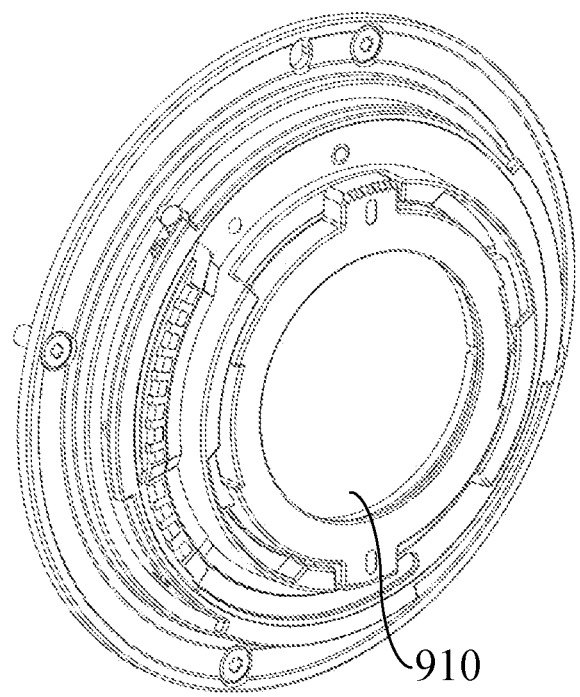
FIG. 30 is a perspective view of the filter holder unit and the mount cover according to the eighth embodiment.
Figure 31:
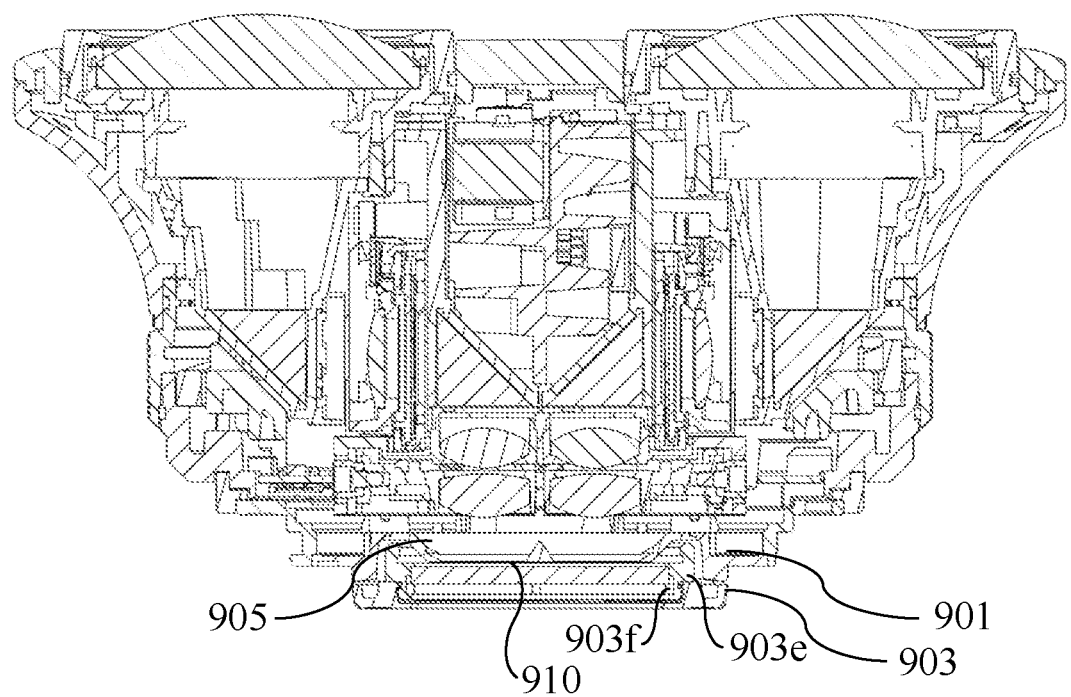
FIG. 31 is a sectional view of the entire lens barrel including the filter holder unit according to the eighth embodiment.
Figure 32A:
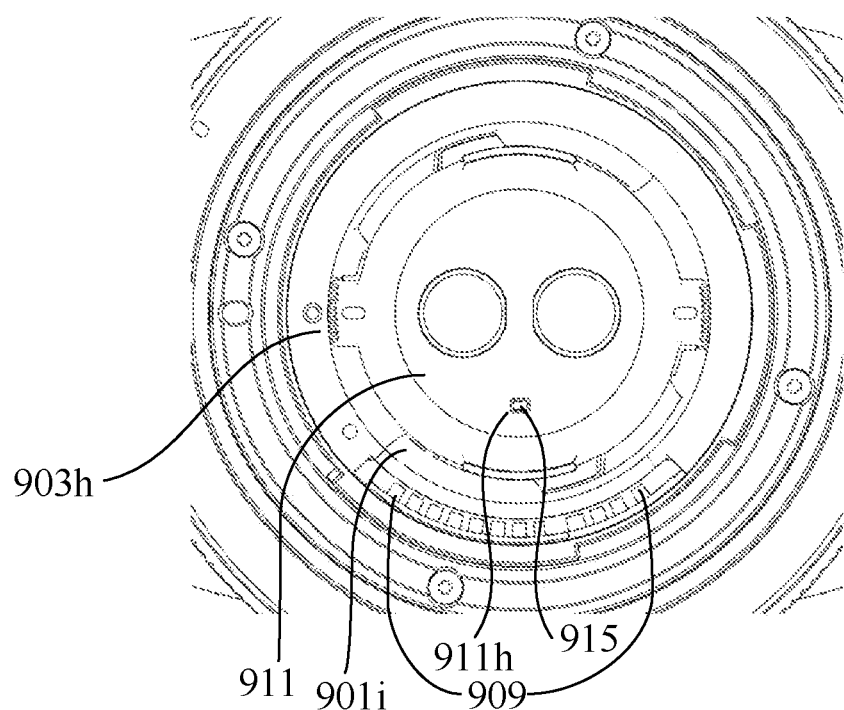
FIGS. 32A and 32B are front views of the filter holder unit and the mount cover according to the eighth embodiment.
Figure 32B:
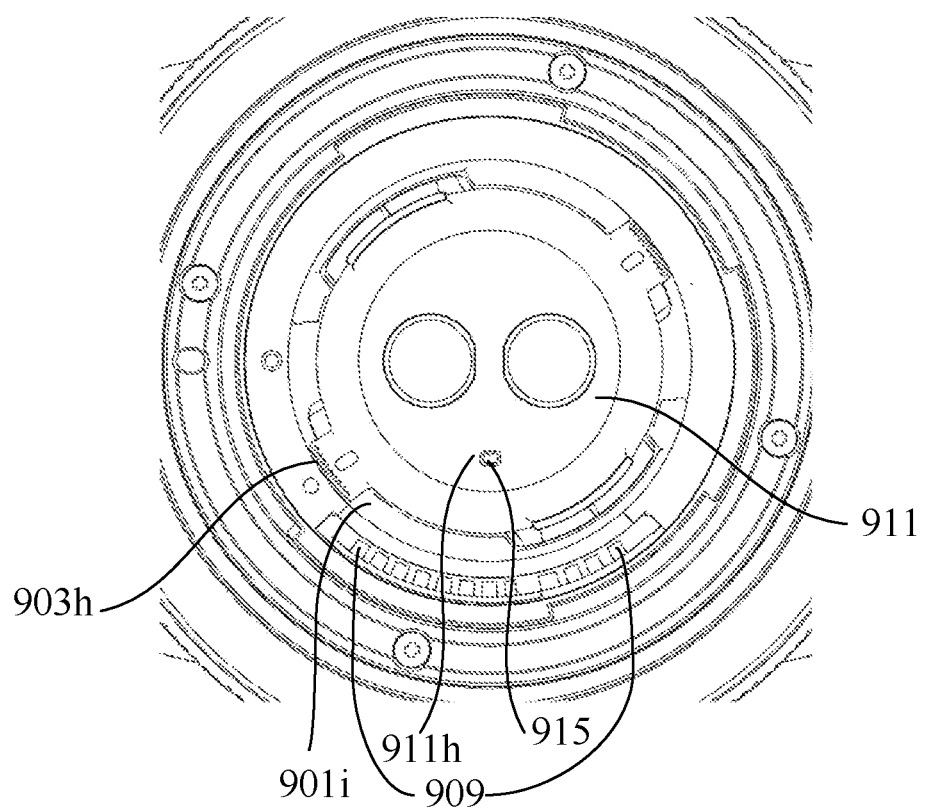

Referring now to FIGS. 29A to 32B, a description will be given of the embodiment. FIGS. 29A and 29B are exploded perspective views of the filter holder unit that holds a filter. FIG. 29B illustrates only the bayonet mechanism portion of the mount cover 901. FIG. 30 is an overall perspective view including the mount cover 901 mounted with the filter holder unit while the screw filter 910 is attached. FIG. 31 is a sectional view of the entire lens barrel while the screw filter 910 is attached. FIGS. 32A and 32B are front views of the filter holder unit and the mount cover 901.

The filter holder 903 has the flange portion 903f Therefore, the screw filter 910 can be attached only from the object direction. In addition, since the filter holder unit cannot be attached inside out, even if a commercially available thick glass filter is attached, it will not protrude toward the object. Therefore, the glass filter does not intrude in the camera side and collide with the shutter or the like inside the camera.

As illustrated in FIGS. 26A, 32A, and 32B, the filter holder 903 has the finger hook portions 903h. The bayonet attachment and detachment can be performed by grasping and rotating the finger hook portions 903h. On the other hand, a wall 901i is provided on the mount cover 901, and an electric contact 909 of the mount is disposed in the same phase as the wall 901i on one side. Since the finger hook portions 903h are rotatable only in the phase where there is no wall 901i, it is possible to prevent the finger gripping the finger hook portions 903h from coming into contact with the mount contact due to the attachment and detachment operation of the filter holder 903. As a result, since the user's finger does not touch the electrical contact 909, the electrical contact is not contaminated, and communication failure or the like can be prevented.

Regarding focusing, many sheet-shaped gelatin filters generally have a thickness of less than 0.1 mm, and a focus shift amount is only a fraction of that, which is not that large. However, commercially available glass filters generally have a thickness of about 2 mm, and when mounted on the image plane side, the back focus changes by 1/thickness times the refractive index of the glass, roughly estimated at about 0.7 mm at most. As illustrated in FIG. 31, this point can be dealt with by making the focus stroke longer on the extension side due to the entire extension. This point can be dealt with by setting longer the extension amount considering the refractive index and the glass thickness and by changing the extension amount for the focus position between a case where there is the glass screw filter 910 and a case where there is no glass screw filter 910. The mode can be manually set and switched but the mode can be switched by using a sensor.

As illustrated in FIGS. 32A and 32B, the mount cover 911 has an opening 911h, inside of which a photo-reflector (detector) 915 facing the image plane is placed. Due to this configuration, whether or not a filter such as a glass filter is attached can be detected by determining whether or not infrared light (reflected light) emitted from the photo-reflector 915 is received. A glass filter and a gelatin filter have different thicknesses, and a sheet-like gelatin filter is disposed at a position closer to the flange portion 903f behind the female screw 903e, that is, on the image plane side. Therefore, as a distance from the photo-reflector 915 increases, the position of the reflecting surface becomes distant, and the light intensity received by the photo-reflector 915 changes so that erroneous detection does not occur.

This embodiment can selectively attach a sheet-like gelatin filter or a glass screw filter, and switch the extension amount according to focus changes.

According to each embodiment, it is possible to provide a lens apparatus and an image pickup apparatus to and from which a filter can be easily attached and removed. With the configuration of each embodiment, it is possible to prevent dirt adhesion, flaw damage, and deformation of the filter when the filter is attached and removed. Moreover, with the configuration of each embodiment, when removed, the filter is bayonet-fixed to a dust cap and then lidded with a body cap, and thus a filter holding member can be housed in a mount cap. Accordingly, dust adhesion is less likely to occur, and care after removal is unnecessary.

According to this example, it is possible to provide a lens apparatus and an image pickup apparatus to and from which a filter can be easily attached and removed.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Applications Nos. 2022-157470, filed on Sep. 30, 2022, and 2023-081550, May 17, 2023, each of which is hereby incorporated by reference herein in its entirety.

What is claimed is:
1. A lens apparatus comprising:
a first optical system and a second optical system;
a lens mount configured to attach and detach the lens apparatus to and from a camera mount of an image pickup apparatus;
a mount cover provided at the lens mount;
a filter; and
a filter holding member that holds the filter,
wherein the image pickup apparatus includes an image sensor that simultaneously captures two images formed through the first optical system and the second optical system, and
wherein the filter holding member is attachable to the mount cover.
2. The lens apparatus according to claim 1, wherein the mount cover is disposed on an inner peripheral side of the lens mount.

3. The lens apparatus according to claim 1, wherein the filter has a film shape.

4. The lens apparatus according to claim 1, further comprising a protecting member that protects an image plane side of the lens apparatus,
wherein the filter holding member is attachable to the protecting member while being removed from the mount cover.

5. The lens apparatus according to claim 1, further comprising a lid member of the filter holding member,
wherein the filter is sandwiched and fixed between the filter holding member and the lid member.

6. The lens apparatus according to claim 1, wherein the filter holding member includes a protrusion portion that prevents from being attached to the mount cover in a flipped-over state.

7. The lens apparatus according to claim 1,
wherein a first opening opened for the first optical system and a second opening opened for the second optical system are formed through the mount cover.

8. The lens apparatus according to claim 7, wherein the filter holding member allows the filter to be simultaneously inserted into or retracted from the first opening and the second opening.

9. The lens apparatus according to claim 1, wherein the filter holding member is attachable to the mount cover by a bayonet structure.

10. The lens apparatus according to claim 1, wherein the filter holding member is attachable to the mount cover by magnetic force.

11. The lens apparatus according to claim 1, wherein the filter holding member is attachable to the mount cover by screw fastening.

12. The lens apparatus according to claim 1, wherein the filter holding member has a female screw portion.

13. The lens apparatus according to claim 12, wherein the filter is screwed with the female screw portion of the filter holding member and fixed.

14. The lens apparatus according to claim 1, wherein the filter holding member includes a first member having a female screw portion and a second member having a male screw portion, and
wherein the female screw portion and the male screw portion are screwed together and sandwich the filter.

15. The lens apparatus according to claim 14, wherein the second member is configured to be assembled from an object direction.

16. The lens apparatus according to claim 14, wherein the first member has a flange portion that determines a position of the second member.

17. The lens apparatus according to claim 1, further comprising detector configured to detect that the filter has been attached.

18. An image pickup apparatus comprising:
the image sensor; and
the lens apparatus according to claim 1.

19. The image pickup apparatus according to claim 18, wherein the two images simultaneously captured by the image sensor have a parallax therebetween.

* * * * *